US012571456B2

(12) United States Patent
Maltarich et al.

(10) Patent No.: US 12,571,456 B2
(45) Date of Patent: Mar. 10, 2026

(54) TENSIONER WITH TENSIONER LOCK WITH PROJECTION THAT INCLUDES FIRST AND SECOND PROJECTION PARTS

(71) Applicant: LITENS AUTOMOTIVE PARTNERSHIP, Woodbridge (CA)

(72) Inventors: Matthew Maltarich, South Lyon, MI (US); Edwin Lik Hang So, Woodbridge (CA); Gary John Spicer, Aurora (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 0 days.

(21) Appl. No.: 18/836,727

(22) PCT Filed: Feb. 7, 2023

(86) PCT No.: PCT/CA2023/050161
§ 371 (c)(1),
(2) Date: Aug. 7, 2024

(87) PCT Pub. No.: WO2023/147676
PCT Pub. Date: Aug. 10, 2023

(65) Prior Publication Data
US 2025/0137513 A1      May 1, 2025

Related U.S. Application Data

(60) Provisional application No. 63/307,282, filed on Feb. 7, 2022.

(51) Int. Cl.
| | |
|---|---|
| *F16H 7/12* | (2006.01) |
| *F02B 67/06* | (2006.01) |
| *F16H 7/08* | (2006.01) |

(52) U.S. Cl.
CPC .............. *F16H 7/12* (2013.01); *F02B 67/06* (2013.01); *F16H 2007/081* (2013.01);
(Continued)

(58) Field of Classification Search
CPC ................. F16H 7/12; F16H 2007/081; F16H 2007/0846; F16H 2007/0865;
(Continued)

(56) References Cited

U.S. PATENT DOCUMENTS

| | | | | |
|---|---|---|---|---|
| 4,832,665 A | * | 5/1989 | Kadota | ................. F16H 7/1227 474/112 |
| 5,244,438 A | * | 9/1993 | Golovatai-Schmidt | ... F01L 1/02 474/112 |

(Continued)

FOREIGN PATENT DOCUMENTS

| | | |
|---|---|---|
| DE | 4015027 A1 | 11/1991 |
| DE | 102016221797 B4 | 5/2018 |

(Continued)

OTHER PUBLICATIONS

International Search Report and Written Opinion from PCT Application No. PCT/CA2023/051527 Feb. 9, 2024.
(Continued)

*Primary Examiner* — Henry Y Liu
(74) *Attorney, Agent, or Firm* — Aird & McBurney LP

(57) ABSTRACT

In an aspect, a tensioner is provided for an endless drive arrangement. The tensioner includes a base, an arm movably mounted to the base, and which has a pulley thereon for engagement with a belt. The tensioner further includes an arm biasing member to bias the arm in a free arm direction, and a tensioner lock, including a locking feature on one of the arm and the base, and a projection that is movably mounted to the other of the arm and the base, and is movable between a locking position and a release position. The
(Continued)

projection includes first and second parts. The second part is engageable with the locking feature. The first part has a first projection-withdrawal limit surface thereon that is engageable with a second projection-withdrawal limit surface on the other of the arm and the base to prevent complete withdrawal of the projection.

8 Claims, 20 Drawing Sheets

(52) U.S. Cl.
CPC ................ *F16H 2007/0846* (2013.01); *F16H 2007/0865* (2013.01); *F16H 2007/0893* (2013.01); *F16H 2007/0897* (2013.01)

(58) Field of Classification Search
CPC ..... F16H 2007/0893; F16H 2007/0897; F16H 7/0831; F16H 2007/0878; F16H 7/08; F02B 67/06
USPC .................................................. 474/135, 112
See application file for complete search history.

(56) References Cited

U.S. PATENT DOCUMENTS

| | | | | |
|---|---|---|---|---|
| 5,266,067 A * | 11/1993 | Gapco | ................... | F16H 7/1281 474/135 |
| 6,375,588 B1 * | 4/2002 | Frankowski | .......... | F16H 7/1227 474/135 |
| 6,659,896 B1 * | 12/2003 | Stief | ..................... | F16H 7/1281 474/135 |
| 6,932,731 B2 * | 8/2005 | Kaiser | ................... | F16H 7/1218 474/135 |
| 7,083,040 B2 | 8/2006 | Finger | | |
| 7,163,478 B2 | 1/2007 | Oliver | | |
| 7,285,065 B2 * | 10/2007 | Dinca | ....................... | F16H 7/24 474/135 |
| 7,611,431 B2 * | 11/2009 | Dinca | ................... | F16H 7/1281 474/135 |
| 7,874,950 B2 * | 1/2011 | Lehtovaara | .......... | F16H 7/1281 474/135 |
| 8,100,793 B2 * | 1/2012 | D'Amicantonio | .... | F16H 7/1218 474/138 |
| 8,702,543 B2 * | 4/2014 | Quintus | ................ | F16H 7/1281 474/135 |
| 9,709,137 B2 * | 7/2017 | Walter | ................... | F16H 7/1218 |
| 9,726,051 B2 * | 8/2017 | Frankowski | ............ | F16H 7/129 |
| 9,790,817 B2 * | 10/2017 | Frankowski | .......... | F16H 7/1209 |
| 9,933,051 B2 * | 4/2018 | Bauerdick | ............. | F16H 7/0831 |
| 10,309,497 B2 * | 6/2019 | Walter | ................... | F16H 7/1218 |
| 10,859,141 B2 * | 12/2020 | Frankowski | .......... | F16H 7/1218 |
| 11,078,993 B2 * | 8/2021 | Walter | ................... | F16H 7/1218 |
| 11,293,530 B2 | 4/2022 | Faria | | |
| 12,338,894 B2 * | 6/2025 | Costa | ..................... | F16H 7/1218 |
| 2003/0008739 A1 * | 1/2003 | Asbeck | ................. | F16H 7/1218 474/135 |
| 2003/0017894 A1 * | 1/2003 | Kaiser | ................... | F16H 7/1218 474/112 |
| 2004/0180745 A1 * | 9/2004 | Dinca | ................... | F16H 7/1281 474/134 |
| 2005/0043131 A1 * | 2/2005 | Asbeck | ................. | F16H 7/1218 474/135 |
| 2007/0010361 A1 | 1/2007 | Kobelev | | |
| 2008/0293527 A1 * | 11/2008 | D'Amicantonio | .... | F16H 7/1218 474/135 |
| 2009/0011881 A1 * | 1/2009 | Lehtovaara | ........... | F16H 7/1281 474/135 |
| 2014/0287859 A1 * | 9/2014 | Frankowski | .......... | F16H 7/1218 474/135 |
| 2014/0315673 A1 * | 10/2014 | Zacker | ................... | F16H 7/1218 474/135 |
| 2015/0275706 A1 * | 10/2015 | Frankowski | .............. | F16H 7/12 123/90.31 |
| 2015/0285344 A1 * | 10/2015 | Buchen | ................. | F16H 7/1281 474/135 |
| 2015/0345597 A1 * | 12/2015 | Walter | ................... | B60K 25/00 474/134 |
| 2017/0175857 A1 * | 6/2017 | Walter | ................... | B60K 25/00 |
| 2018/0320764 A1 * | 11/2018 | Frankowski | .......... | F16H 7/1218 |
| 2019/0257393 A1 * | 8/2019 | Walter | ................... | F02B 67/06 |
| 2020/0032884 A1 | 1/2020 | Gross | | |

FOREIGN PATENT DOCUMENTS

| | | | |
|---|---|---|---|
| EP | 1541896 A1 | 6/2005 |
| JP | 2012154455 A | 8/2012 |
| WO | 2018019332 A1 | 2/2018 |

OTHER PUBLICATIONS

EP Application No. 23749330.9, Offie Action, European Patent Office, Jan. 14, 2026.

* cited by examiner

TENSIONER WITH TENSIONER LOCK WITH PROJECTION THAT INCLUDES FIRST AND SECOND PROJECTION PARTS

CROSS-REFERENCE TO RELATED APPLICATIONS

This application is a U.S. national stage entry of International Application No. PCT/CA2023/050161 filed on Feb. 7, 2023, which claims priority to U.S. Patent Application No. 63/307,282 filed Feb. 7, 2022, the contents of all of which are incorporated herein by reference in their entirety.

FIELD

The specification relates generally to tensioners for endless drive arrangements on engines and more particularly to a tensioner with a tensioner lock that holds an arm of the tensioner to prevent movement of the arm past a limit position.

BACKGROUND OF THE DISCLOSURE

It is known to provide tensioners for accessory drive belts or other timing belts for engines. It is sometimes necessary or desirable to replace the tensioner. With a typical tensioner, the tensioner is held in a pre-tensioned state in order to facilitate its installation on the engine, so that the tensioner's pulley can more easily clear the belt during the installation process. However, the tensioner is typically held in this pre-tensioned state with a pin, that the installer then removes once the tensioner has been installed, so as to permit the tensioner's arm to drive the pulley into the belt. The pin however, is typically loose and so as the installer pulls it out, the very high forces on the tensioner arm can eject the pin suddenly, and at high speed, posing a danger to the installer and potentially being launched into some other area of the engine compartment where it can interfere with the operation of some other underhood component. Some solutions have been proposed in the prior art, in order to eliminate the risk of a pin being lost or injuring the installer, however such solutions are in some cases relatively expensive and/or inconvenient to use.

There is a need for a solution that performs well, and that is inexpensive, and/or that solves or mitigates one or more other problems.

SUMMARY OF THE DISCLOSURE

In one aspect, there is provided a tensioner for tensioning an endless drive arrangement on an engine. The tensioner includes a tensioner base that is mounted to be stationary relative to the engine, and a tensioner arm that is movably mounted to the tensioner base for movement about a tensioner arm axis and which has a tensioner pulley rotatably mounted thereto for rotation about a tensioner pulley axis that is spaced from the tensioner arm axis. The tensioner pulley is positioned for engagement with an endless drive member of the endless drive arrangement. The tensioner further includes a tensioner arm biasing member that is positioned to bias the tensioner arm in a free arm direction, and a tensioner lock. The tensioner lock includes a locking feature on one of the tensioner arm and the tensioner base, and a projection that is movably mounted to the other of the tensioner arm and the tensioner base, and is movable between a locking position and a release position. In the locking position, the projection cooperates with the locking feature to limit movement of the tensioner arm in the free arm direction past a limit position. In the release position, the projection permits movement of the tensioner arm in the free arm direction. The tensioner lock further includes a projection biasing member that is positioned to urge the projection towards the release position. The projection and the locking feature are positioned such that, when the projection is in the locking position, urging of the tensioner arm in the free arm direction by the tensioner arm biasing member causes a locking force to be applied by the locking feature on the projection to hold the projection in the locking position, and such that, movement of the tensioner arm opposite to the free arm direction releases the locking force so as to permit the projection biasing member to drive the projection to the release position, thereby freeing the tensioner arm to move in the free arm direction. The projection includes a first projection part and a second projection part. One of the first and second projection parts includes a recess into which the other of the first and second projection parts extends to hold the first and second projection parts together. The second projection part is engageable with the locking feature to limit movement of the tensioner arm in the free arm direction past the limit position. The first projection part has a first projection-withdrawal limit surface thereon that is engageable with a second projection-withdrawal limit surface on said other of the tensioner arm and the tensioner base to prevent complete withdrawal of the projection from said other of the tensioner arm and the tensioner base.

In another aspect, there is provided a tensioner for tensioning an endless drive arrangement on an engine. The tensioner includes a tensioner base that is mounted to be stationary relative to the engine. The tensioner further includes a first tensioner arm that is movably mounted to the tensioner base for movement about a first tensioner arm axis and which has a first tensioner pulley rotatably mounted thereto for rotation about a first tensioner pulley axis that is spaced from the first tensioner arm axis. The first tensioner pulley is positioned for engagement with a first span of an endless drive member of the endless drive arrangement. The tensioner further includes a second tensioner arm that is movably mounted to the tensioner base for movement about a second tensioner arm axis and which has a second tensioner pulley rotatably mounted thereto for rotation about a second tensioner pulley axis that is spaced from the second tensioner arm axis. The second tensioner pulley is positioned for engagement with a second span of the endless drive member of the endless drive arrangement. The tensioner further includes a tensioner arm biasing member that is positioned to bias the first and second tensioner arms in a free arm direction relative to one another. The tensioner further includes a tensioner lock, which includes a locking feature, a projection and a projection biasing member. The locking feature is on one of the first tensioner arm and the second tensioner arm. The projection is movably mounted to the other of the first tensioner arm and the second tensioner arm, and is movable between a locking position and a release position. In the locking position, the projection cooperates with the locking feature to limit movement of the first and second tensioner arms in the free arm direction past a limit position. In the release position, the projection permits movement of the first and second tensioner arms in the free arm direction. The projection biasing member is positioned to urge the projection towards the release position. The projection and the locking feature are positioned such that, when the projection is in the locking position, urging of the first and second tensioner arms in the free arm direction by the tensioner arm biasing member causes a locking force to be applied by the locking feature on the projection to hold the projection in the locking position, and such that, movement of the first and second tensioner arms opposite to the free arm direction releases the locking force so as to permit the projection biasing member to drive the projection to the release position, thereby freeing the first and second tensioner arms to move in the free arm direction. The projection includes a first projection part and a second projection part. One of the first and second projection parts includes a recess into which the other of the first and second projection parts extends to hold the first and second projection parts together. The second projection part is engageable with the locking feature to limit movement of the first and second tensioner arms in the free arm direction past the limit position. The first projection part has a first projection-withdrawal limit surface thereon that is engageable with a second projection-withdrawal limit surface on the other of the first and second tensioner arms to prevent complete withdrawal of the projection from said other of the first and second tensioner arms.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings.

Figure 1:
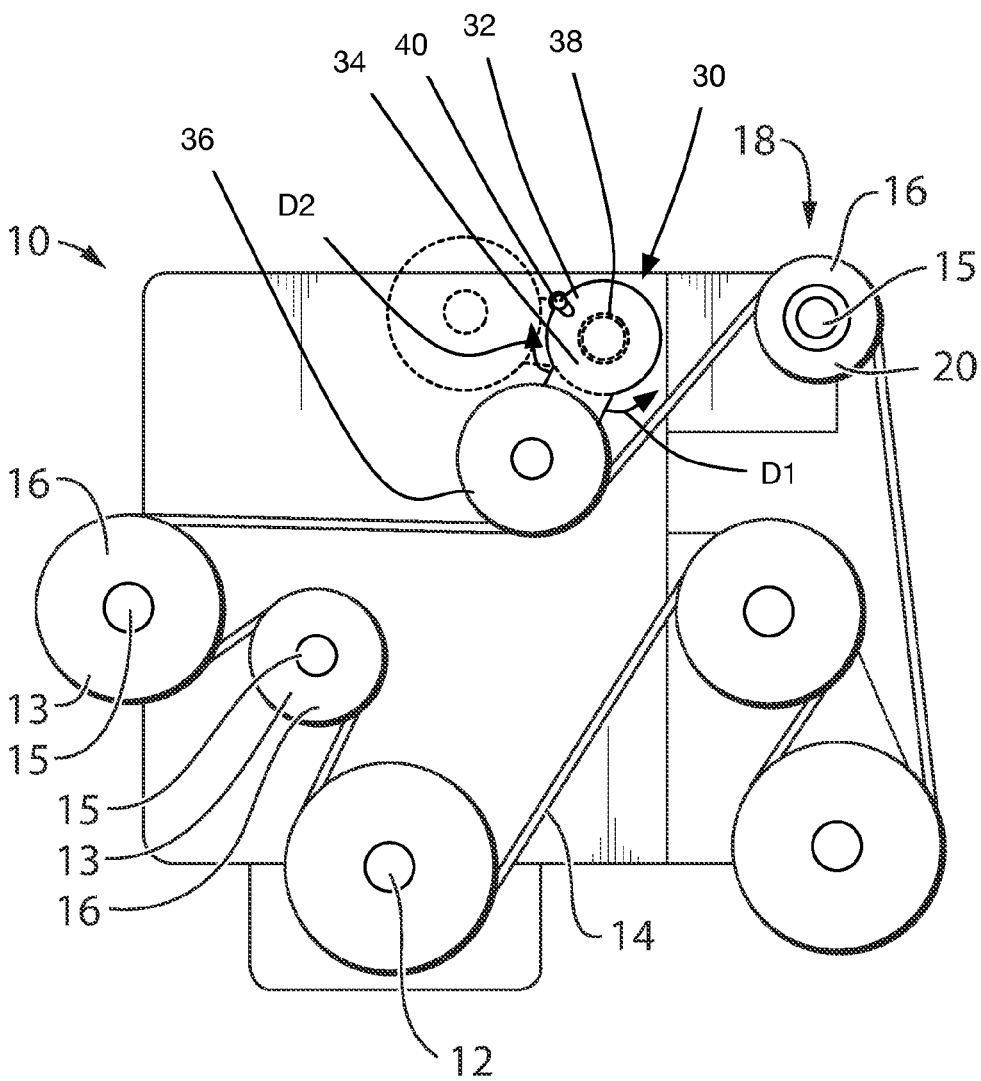
FIG. 1 shows an elevation view of engine with an endless drive arrangement, with a tensioner in accordance with an embodiment of the present disclosure.

Unless otherwise specifically noted, articles depicted in the drawings are not necessarily drawn to scale.

DETAILED DESCRIPTION OF EXAMPLE EMBODIMENTS

For simplicity and clarity of illustration, where considered appropriate, reference numerals may be repeated among the Figures to indicate corresponding or analogous elements. In addition, numerous specific details are set forth in order to provide a thorough understanding of the embodiment and embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Reference is made to FIG. 1, which shows an engine 10 for a vehicle. The engine 10 includes a crankshaft 12 which drives an endless drive element, which may be, for example, a belt 14. Via the belt 14, the engine 10 drives a plurality of accessories 16, such as a supercharger 18. Each accessory 16 includes an input drive shaft 15 with a pulley 13 thereon, which is driven by the belt 14. A decoupler pulley 20 may be provided instead of a simple pulley, between the belt 14 and the input shaft 15 of any one or more of the belt-driven accessories 16, and in particular the supercharger 18.

A simplified image of a tensioner is shown at 30 in FIG. 1. The tensioner 30 is provided for providing a suitable amount of tension in the belt 14, so as to inhibit belt slip from taking place between the belt 14 and any of the pulleys engaged therewith.

Figure 2:
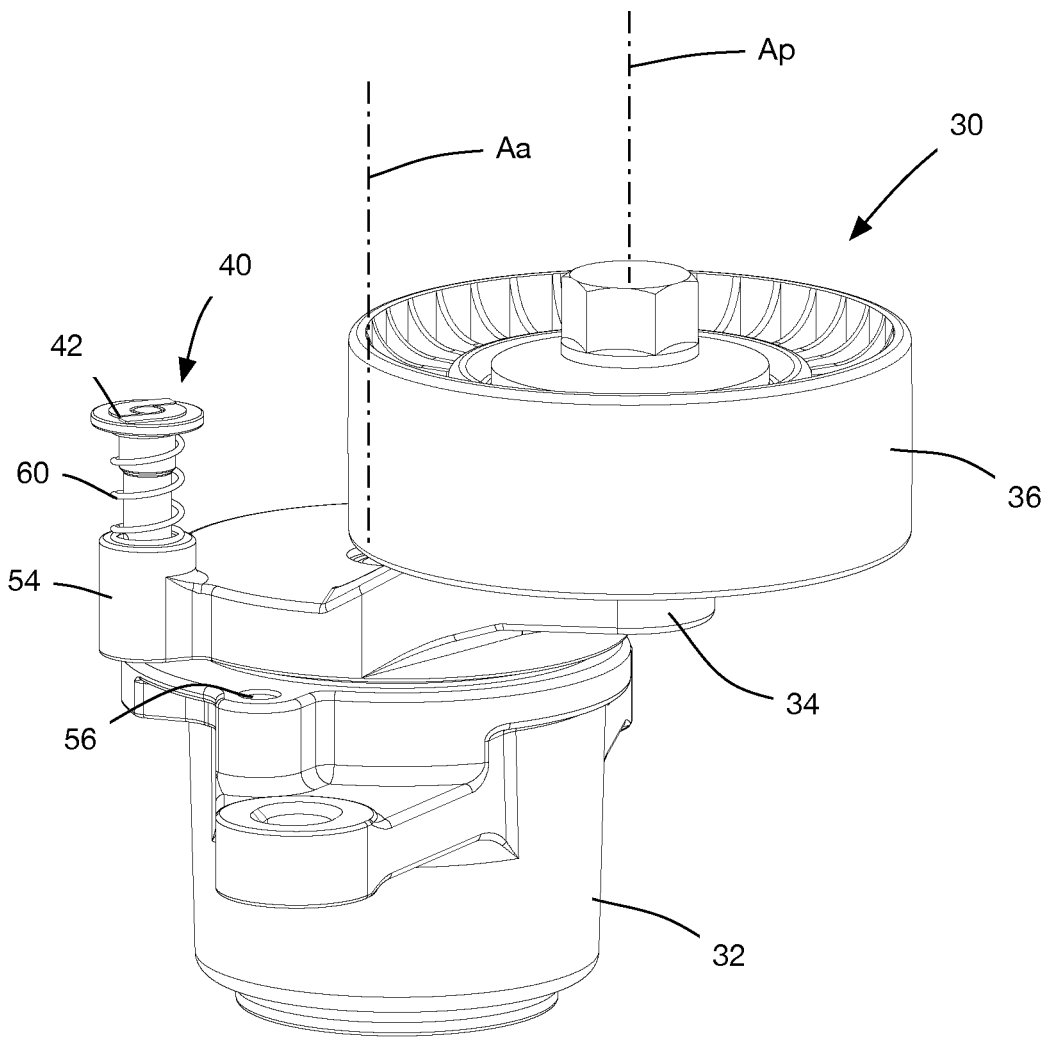
FIG. 2 is a perspective view of the tensioner shown in FIG. 1, with a tensioner lock having a projection in a release position.
Figure 3:
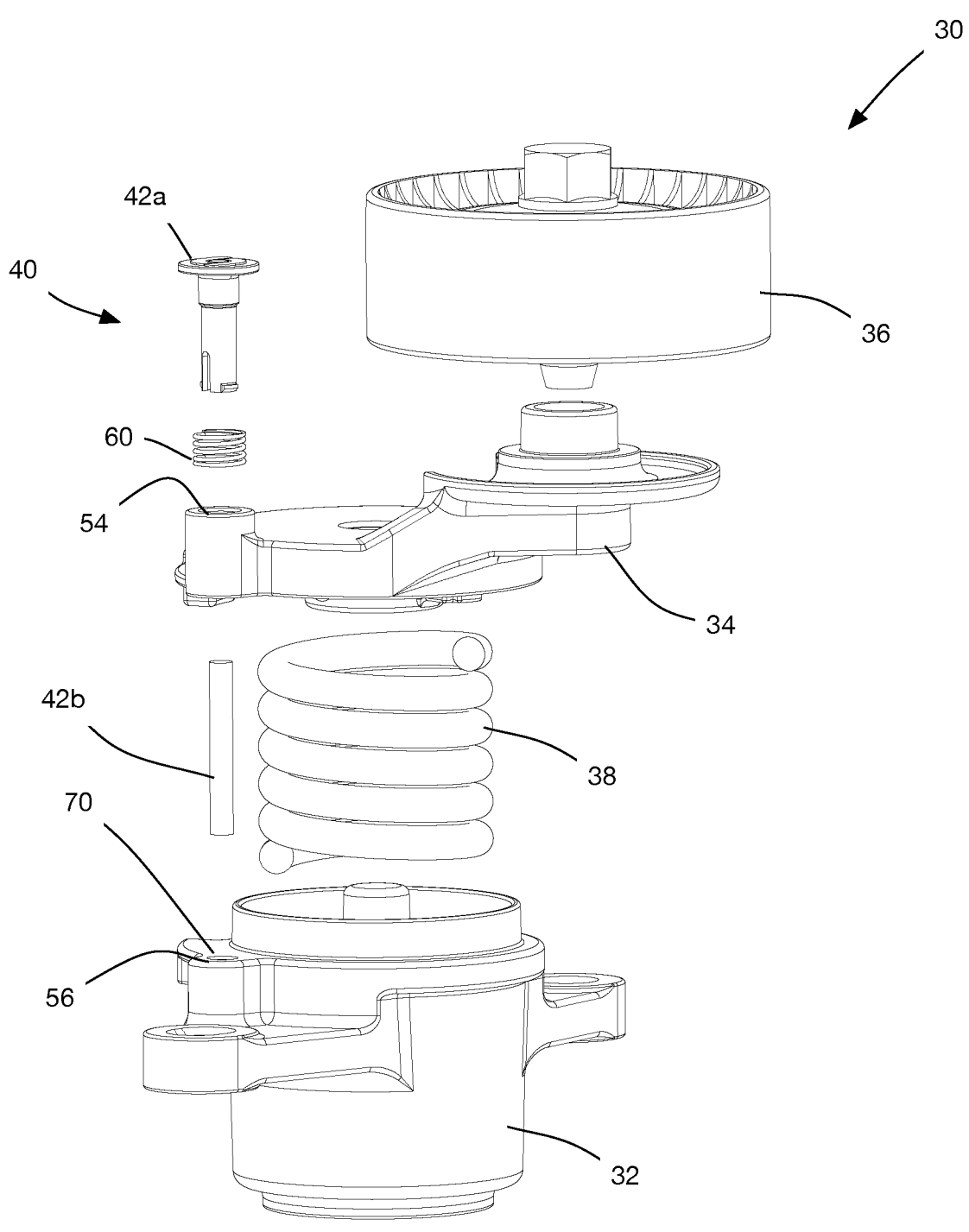
FIG. 3 is a perspective exploded view of the tensioner shown in FIG. 2.

The tensioner 30 is shown in more detail in FIGS. 2 and 3. As is known in the art of tensioners, the tensioner 30 includes a tensioner base 32 that is mountable to a fixed element relative to the engine (which may be the engine block itself, as shown in FIG. 1), and a tensioner arm 34 that is movably mounted to the tensioner base 32 for movement in a free-arm direction shown at D1, which is towards the belt 14 (see FIG. 1) and a load-stop direction shown at D2, which is away from the belt 14. A tensioner pulley 36 is mounted on the tensioner arm 34 for engagement with the belt 14 and which is rotatable about a tensioner pulley axis Ap. A tensioner arm biasing member 38 is positioned to urge the tensioner arm 34 in the free-arm direction, in order to tension the belt 14. The tensioner arm biasing member 38 may be any suitable type of biasing member, such as a helical torsion spring, one or more compression springs or any other suitable type of biasing member. The tensioner arm 34 may be movable via a movement about a tensioner arm axis Aa, relative to the tensioner base 32, or by any other suitable type of movement such as an orbital movement about the tensioner arm axis Aa, which is an axis of orbital motion, as is known in the art.

Figure 4:
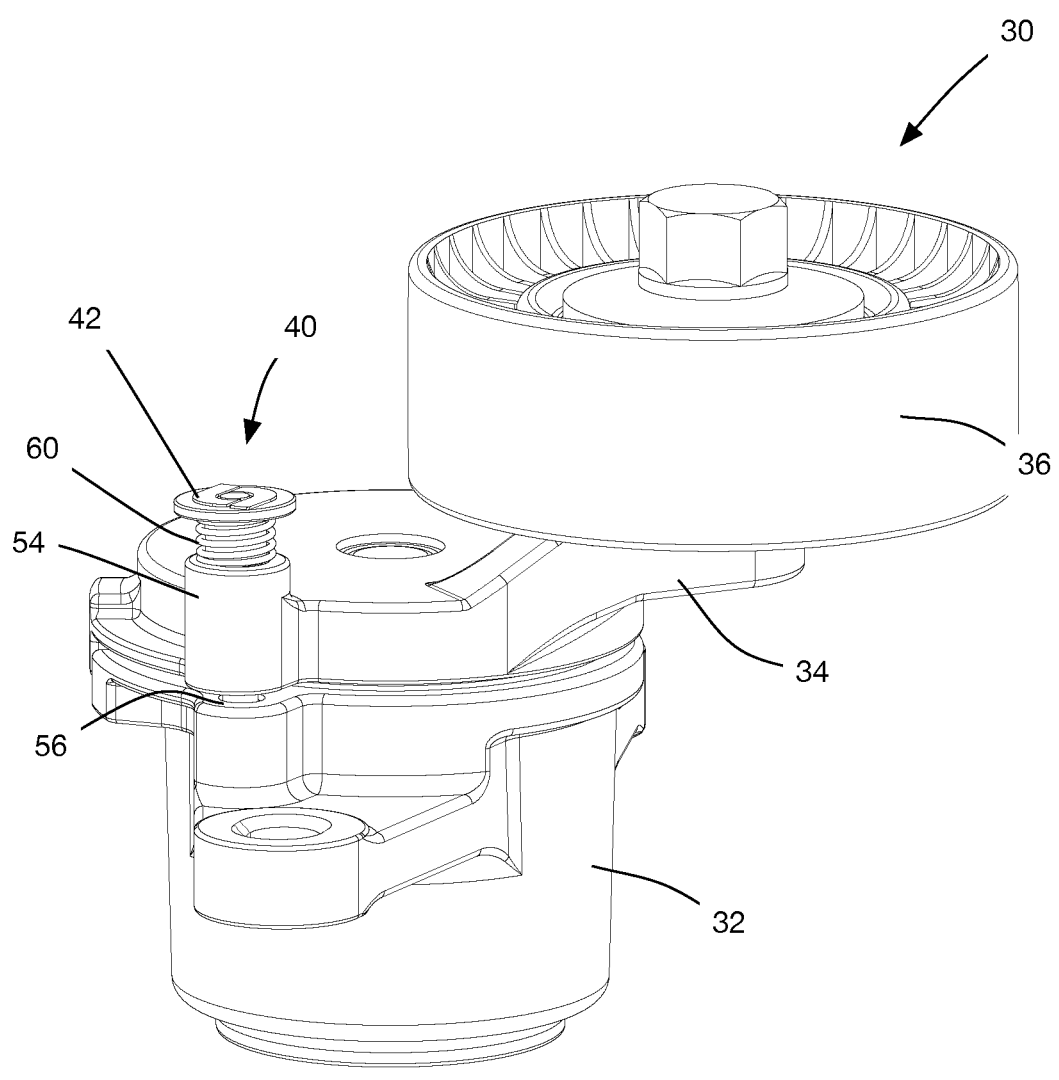
FIG. 4 is a perspective view of the tensioner shown in FIG. 2 with the tensioner lock having the projection in a locking position.

The tensioner 30 may include a tensioner lock 40 (FIGS. 2 and 3). The tensioner lock 40 includes a locking feature 41 that is connected to one of the tensioner arm 34 and the tensioner base 32, and a projection 42 that is movably mounted to the other of the tensioner arm 34 and the tensioner base 32, for movement between a locking position (FIG. 4) and a release position (FIG. 2). In the embodiment shown, the projection 42 is on the tensioner arm 34 and the locking feature 41 is on the tensioner base 32, however in other embodiments the projection 42 could be on the tensioner base 32 and the locking feature 41 could be on the tensioner arm 34.

In the locking position, the projection 42 cooperates with the locking feature 41 to limit movement of the tensioner arm 34 in the free arm direction D1 past a limit position (shown in dashed lines in FIG. 1). In the release position, the projection 42 permits movement of the tensioner arm 34 in the free arm direction past the limit position.

In the embodiment shown, the projection 42 includes a first projection part 42a and a second projection part 42b. The first and second projection parts 42a and 42b may connect together by any suitable means. For example, one of the first and second projection parts 42a and 42b may include a projection connection recess 43 into which the other of the first and second projection parts 42a and 42b extends to hold the first and second projection parts 42a and 42b together. In the example embodiment shown, the first projection part 42a includes the recess (shown at 46 in FIGS. 3 and 5).

The first projection part 42a has a first projection-withdrawal limit surface 46 thereon that is engageable with a second projection-withdrawal limit surface 48 on the aforementioned other of the tensioner arm 34 and the tensioner base 32, to prevent complete withdrawal of the projection 42 from the aforementioned other of the tensioner arm 32 and the tensioner base 34. In the example shown, the first projection-withdrawal limit surface 46 includes a first lip surface 50a on a first tab 51a on a first flex arm 52a and a second lip surface 50b on a second tab 51b on a second flex arm 52b. The second projection-withdrawal limit surface 48, in the example shown, is in the form of an internal shoulder in a first pass-through aperture 54 through which the projection 42 passes.

The second projection part 42b is engageable with the locking feature 41 to limit movement of the tensioner arm 34 in the free arm direction D1 past the limit position. In the embodiment shown, the locking feature 41 is a locking aperture 56.

In another sense, the projection 42 could be referred to as a projection assembly 42 which includes a projection support and a projection. In such a sense, the first projection part 42a could be referred to as the projection support 42a and the second projection part 42b could be referred to as the projection 42b. Notwithstanding such an alternative nomenclature, throughout the remainder of the present description, the projection 42 is referred to as a projection, which includes the first projection part 42a and the second projection part 42b.

The tensioner lock 40 further includes a projection biasing member 60 that is positioned to urge the projection 42 towards the release position. The projection biasing member 60 may be a helical compression spring, or any other suitable type of biasing member.

The projection 42 and the locking feature 41 are positioned such that, when the projection 42 is in the locking position, urging of the tensioner arm 34 in the free arm direction by the tensioner arm biasing member 38 causes a locking force F1 (FIG. 5) to be applied by the locking feature 41 on the projection to hold the projection 42 in the locking position, and such that, movement of the tensioner arm 34 opposite to the free arm direction releases the locking force so as to permit the projection biasing member 60 to drive the projection to the release position, thereby freeing the tensioner arm 34 to move in the free arm direction.

Figure 5:
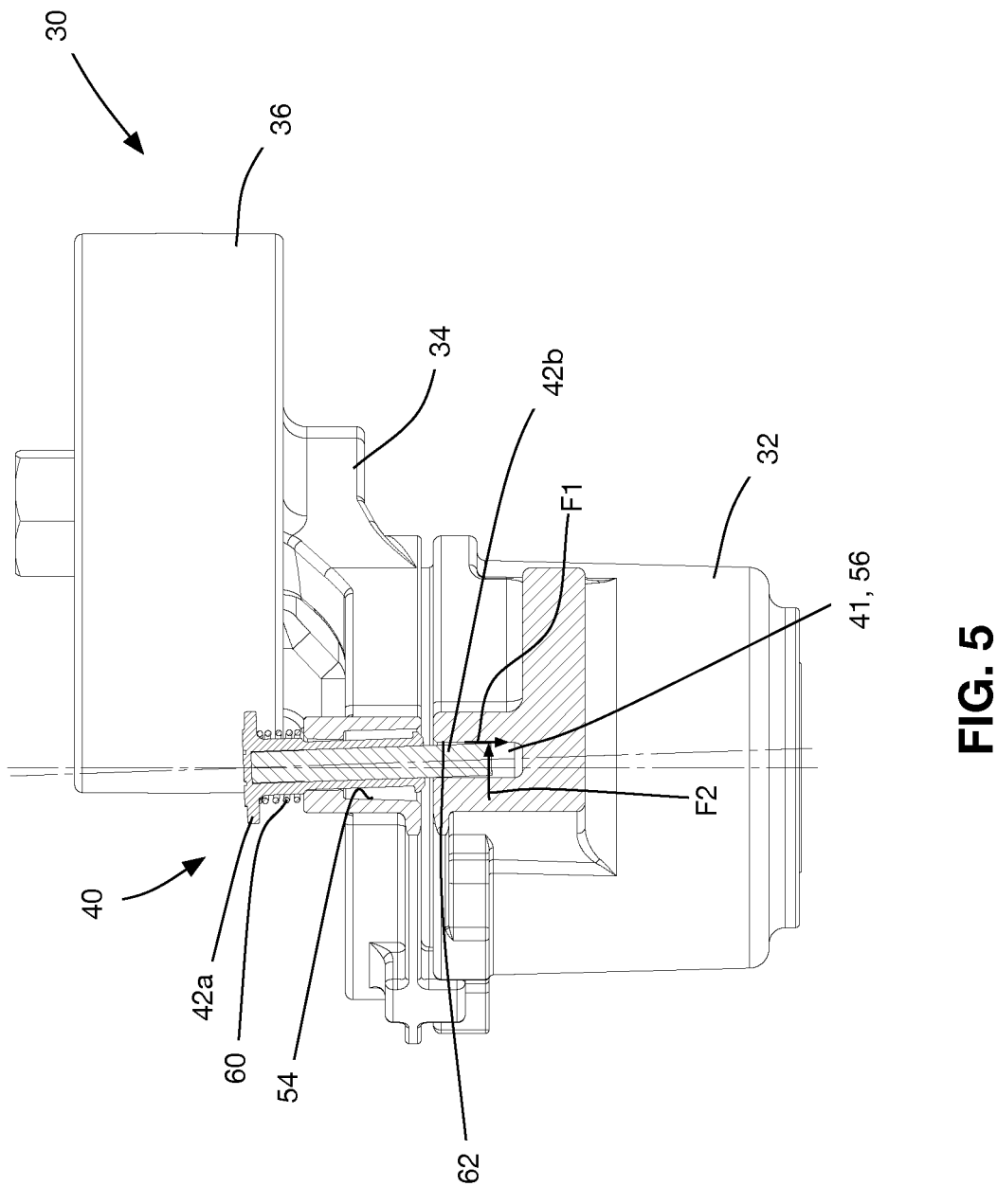
FIG. 5 is a sectional side view the tensioner shown in FIG. 2 with the projection in the locking position.

The generation of the locking force F1 is described below. As can be seen in FIG. 5, the projection 42 and the locking feature 41 are positioned such that, when the projection 42 is in the locking position, urging of the tensioner arm in the free arm direction by the tensioner arm biasing member 38 causes a circumferentially directed force F2 to be applied on the wall 62 of the locking aperture 56, by the projection 42. The circumferentially directed force F2 is circumferentially directed about the tensioner arm axis Ap. This circumferentially directed force F2 results in a friction force to be applied by the locking feature 41 (the wall shown at 62 of the locking aperture 56, specifically) on the projection 42. By selecting the surface finishes of the projection 42 and the wall 62 of the locking aperture 56) the friction force may be selected to be strong enough to overcome the biasing force of the projection biasing member 60 and thereby hold the projection 42 in the locking position. This friction force is the locking force F1 since it is the force that holds the projection 42 in the locking position. In the embodiment shown, as can be seen, the projection 42 becomes slightly canted due to the moment that is applied to it as a result of the arrangement of the tensioner arm 34, the projection 42 and the tensioner base 32.

Figure 6:
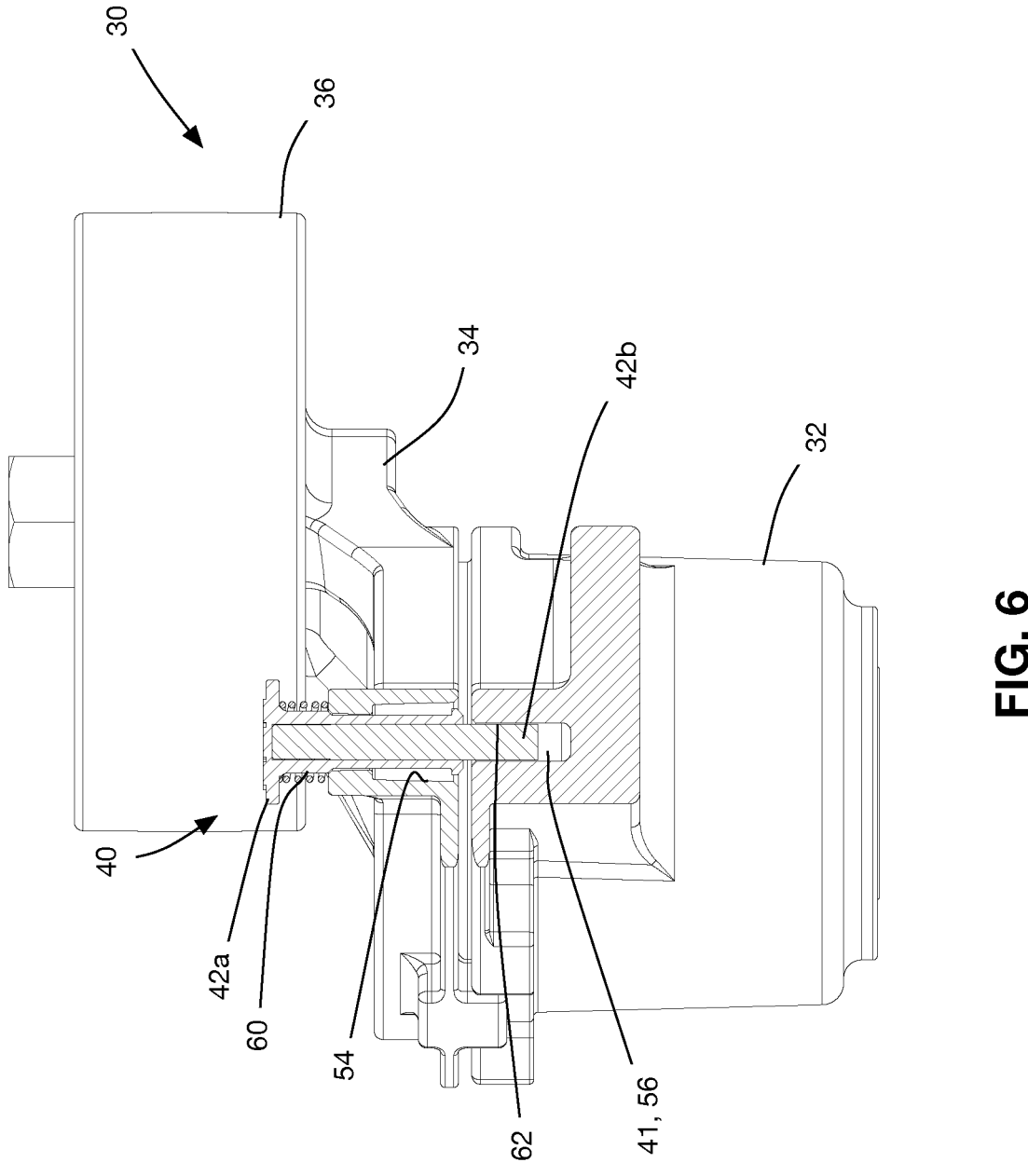
FIG. 6 is a sectional side view the tensioner shown in FIG. 2 with the projection about to move to the locking position.

In the embodiment shown, movement of the tensioner arm 34 opposite to the free arm direction D1 (i.e. movement of the tensioner arm 34 in the load-stop direction D2), removes the projection 42 from being engaged (or engaged as strongly) with the wall 62 of the locking aperture 56 (as shown in the position shown in FIG. 6), thereby eliminating or reducing the circumferentially directed force F2 therebetween. Eliminating or reducing the circumferentially directed force F2 therebetween in turn eliminates or reduces the friction force (i.e. the locking force F1) therebetween. In other words, movement of the tensioner arm 34 opposite to the free arm direction D1 (i.e. movement of the tensioner arm 34 in the load-stop direction D2) releases the locking force F1 so as to permit the projection biasing member 60 to drive the projection 42 to the release position, thereby freeing the tensioner arm 34 to move in the free arm direction D1.

Figure 7:
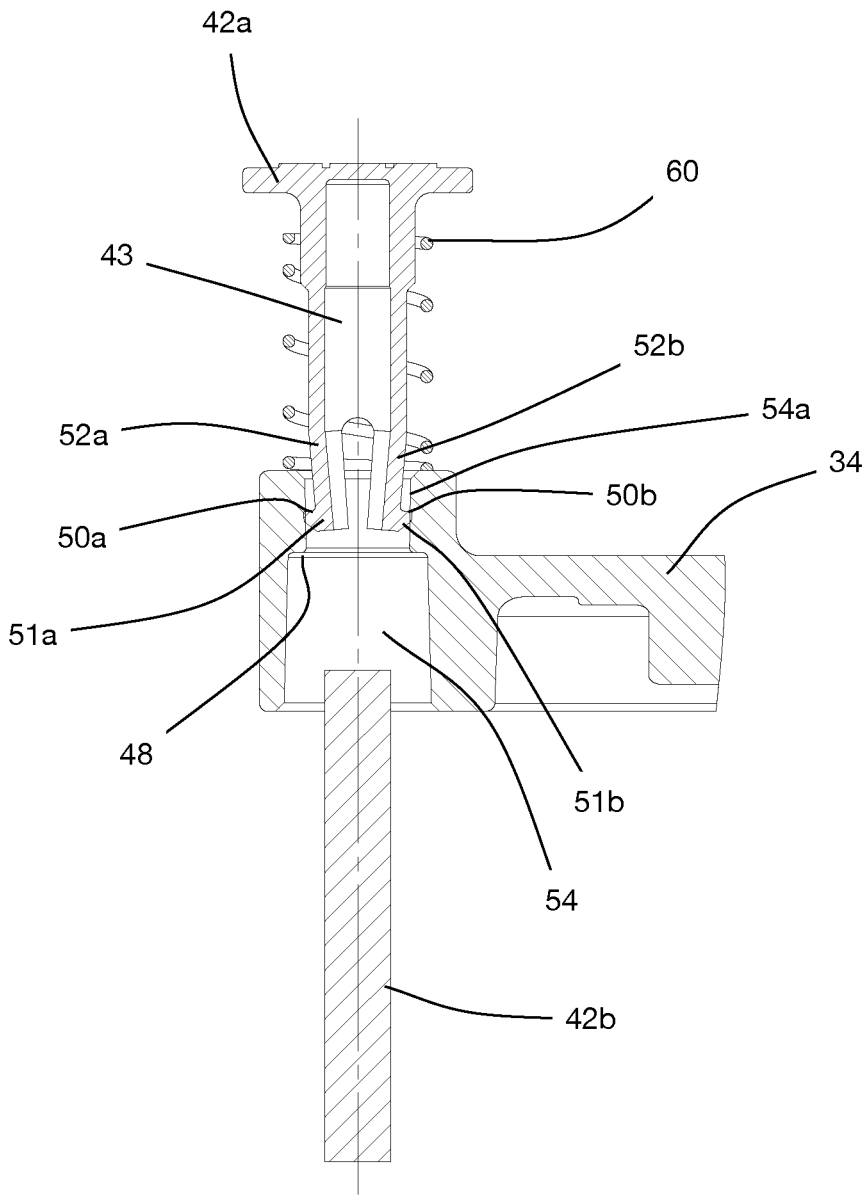
FIG. 7 is a sectional side view showing a step in the assembly of the projection in the tensioner lock shown in FIG. 2.

The assembly of the projection 42 is now described with reference to FIG. 7. To assemble the projection 42, the user can position the projection biasing member 60 onto the first projection part 42a. The user can insert the first projection part 42a into and through a first portion 54a of the first pass-through aperture 54, thereby compressing the flex arms 52a and 52b. Once the user has inserted the first projection part 42a through sufficiently that the first and second tabs 51a and 51b have cleared the first portion of the first pass-through aperture 54, the flex arms 52a and 52b can expand outwards (FIG. 8) so that the first projection-withdrawal limit surface 46 (in this instance including the first lip surface 50, and the second lip surface 50b) is positioned to interact with the second projection-withdrawal limit surface 48 to prevent the withdrawal of the first projection part 42a from the first pass-through aperture 54.

Figure 8:
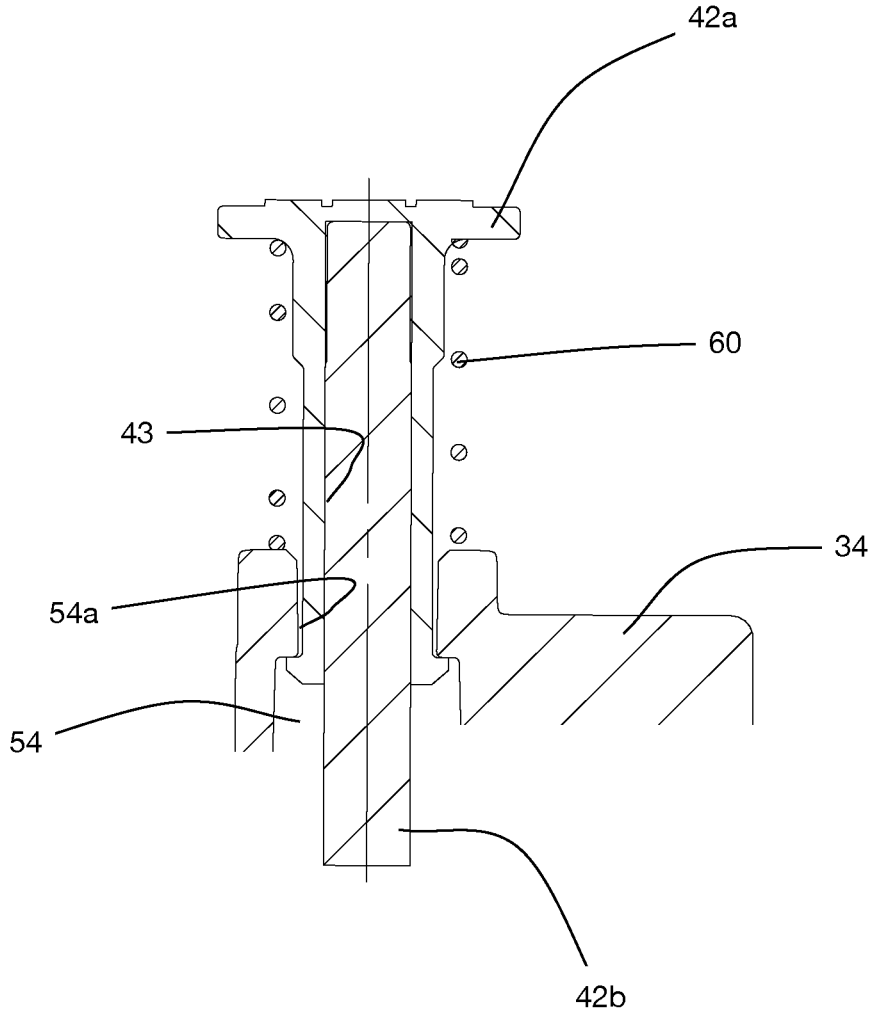
FIG. 8 is a sectional side view showing another step in the assembly of the projection in the tensioner lock shown in FIG. 2.

Once the first projection part 42a is in position with the flex arms 52a and 52b expanded outward, the second projection part 42b can be connected to the first projection part 42a. This may be by driving the second projection part 42b into the projection connection recess 43 in the first projection part 42a (FIG. 8).

As shown in FIG. 2, the tensioner base 32 (i.e. the aforementioned other of the tensioner arm 34 and the tensioner base 32) may further include a second-part-withdrawal limit surface 70 that is positioned to prevent complete withdrawal of the second projection part 42b from the first projection part 42a once the tensioner 30 is fully assembled. As a result, the first and second projection parts 42a and 42b are captured in the tensioner 30 once the tensioner 30 is fully assembled. As a result, the first and second projection parts 42a and 42b are prevented from being separated from the remainder of the tensioner 30 once the tensioner 30 is installed on the vehicle. By ensuring that the projection 42 remains with the tensioner 30, the projection 42 can easily be reinserted into the locking aperture 56 in the event that it is needed at any point, such as to change out the belt 14 in the accessory drive system.

It will be noted that the manufacture of the projection 42 from the first projection part 42a and the second projection part 42b is advantageous since the second projection part 42b may be made from a suitably strong first material such as a metal, while keeping its shape simple, such as a simply extruded shape (in this embodiment, a simple cylindrical shape), while the first projection part 42a may be made from a relatively weaker, second material (e.g. a polymeric material such as a type of nylon), which can be more easily formed (e.g. molded) into a relatively more complex shape, and which is subjected to lower forces than the second projection part 42b.

Figure 9:
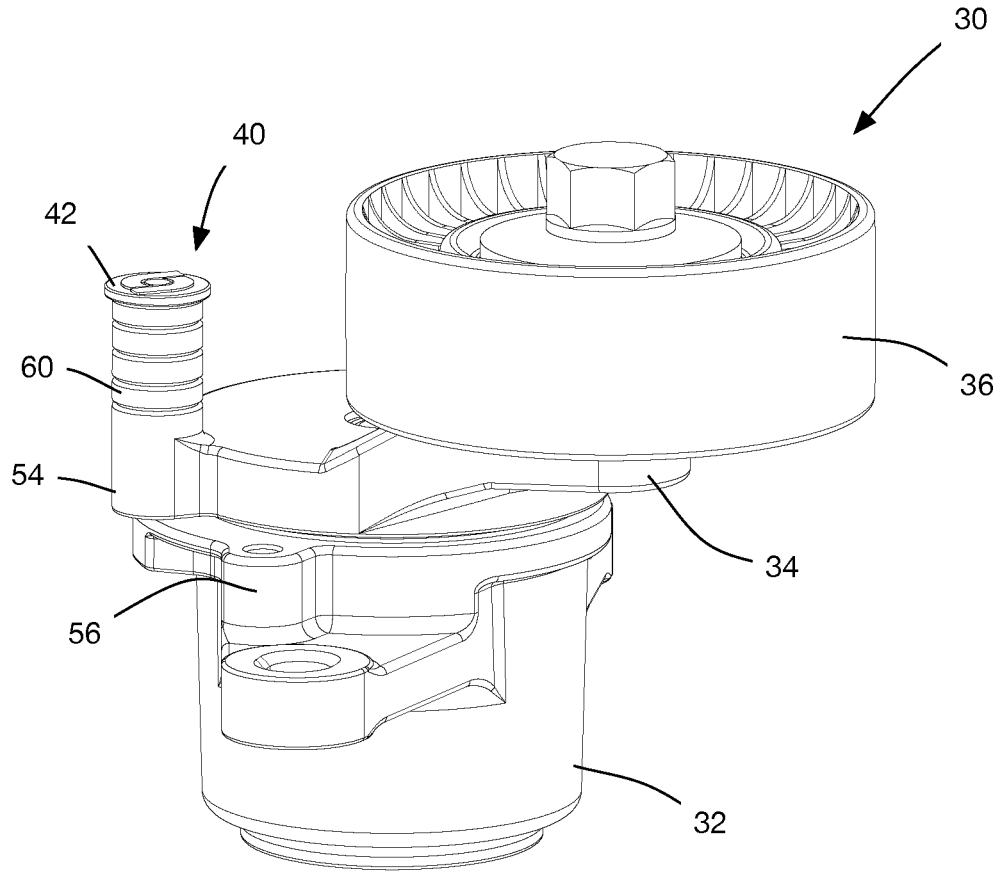
FIG. 9 is a perspective view of a tensioner in accordance with another embodiment of the present disclosure, in which the projection is urged by a closed-cell foam spring.

The projection biasing member 60 may be any other suitable type of biasing member other than a helical coil compression spring. For example, the projection biasing member 60 may be a closed-cell foam spring 64 as shown in FIG. 9.

As can be seen, the projection 42 is movable in the axial direction of the tensioner 30. Put a different way, the projection 42 is movable along a tensioner arm locking axis, shown at Ap1, which is parallel to the tensioner arm axis Aa. This orientation of the tensioner arm locking axis Ap1 makes it easy to operate when holding the tensioner arm 34 and rotating it to the position in which the projection 42 aligns with the locking feature 41. However, it is possible for the orientation of the projection 42 to be other than axial. For example, reference is made to FIG. 10 which shows an exploded view of the tensioner 30 modified such that the projection 42 is movable along a tensioner arm locking axis Ap1 that is radial in direction, instead of axial. In the exploded view, the tensioner arm biasing member 38 has been omitted for convenience. Other minor modifications have been made as well, such as the positions and orientations of the mounting lugs shown at 70, relative to the embodiment shown in FIG. 2. Positioning the projection 42 so that it is movable in a radial direction may make it easier to fit the tensioner 30 into place in certain engine applications where there is no room for the version shown in FIG. 2.

Figure 10:
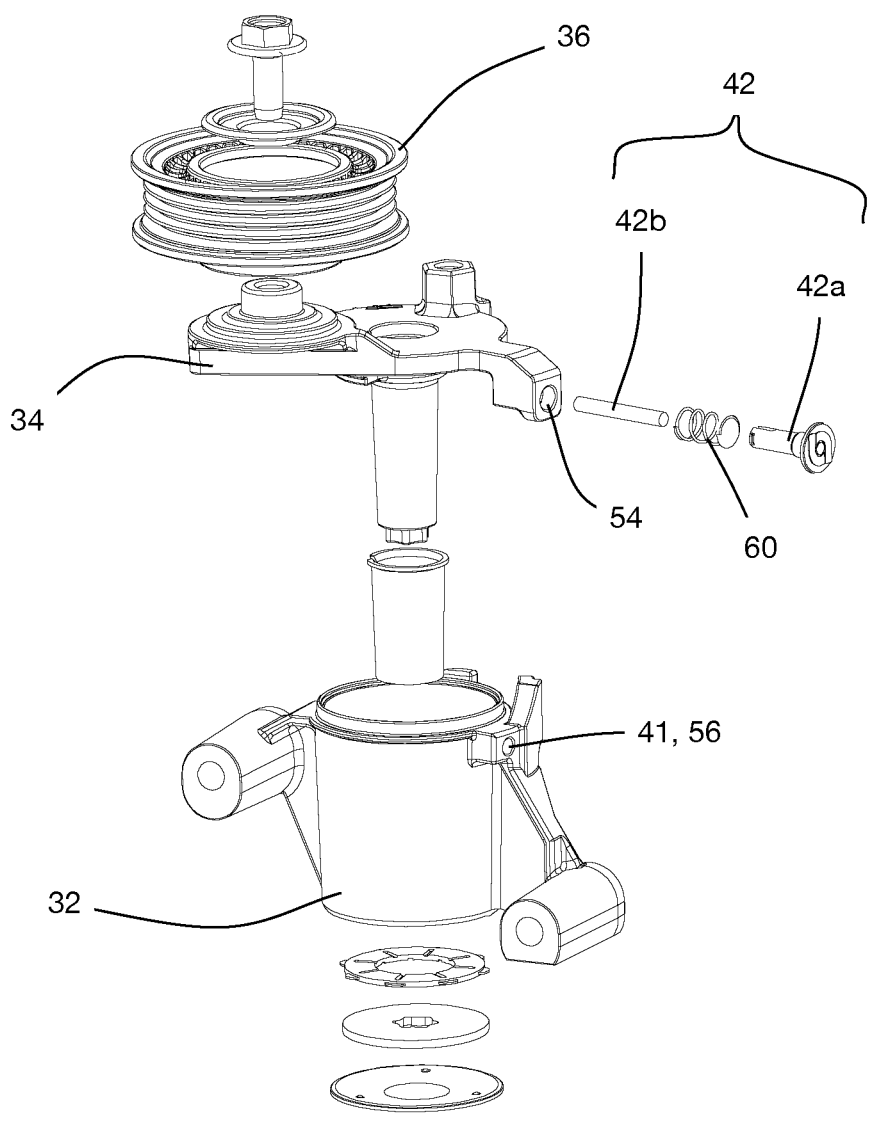
FIG. 10 is an exploded perspective view of a tensioner in accordance with yet another embodiment of the present disclosure, in which the projection moves radially.

As can be seen the features and surfaces present in the embodiment in FIG. 2 are also present in the embodiment shown in FIG. 10, but are oriented in accordance with the direction of movement of the projection 42.

Figure 11:
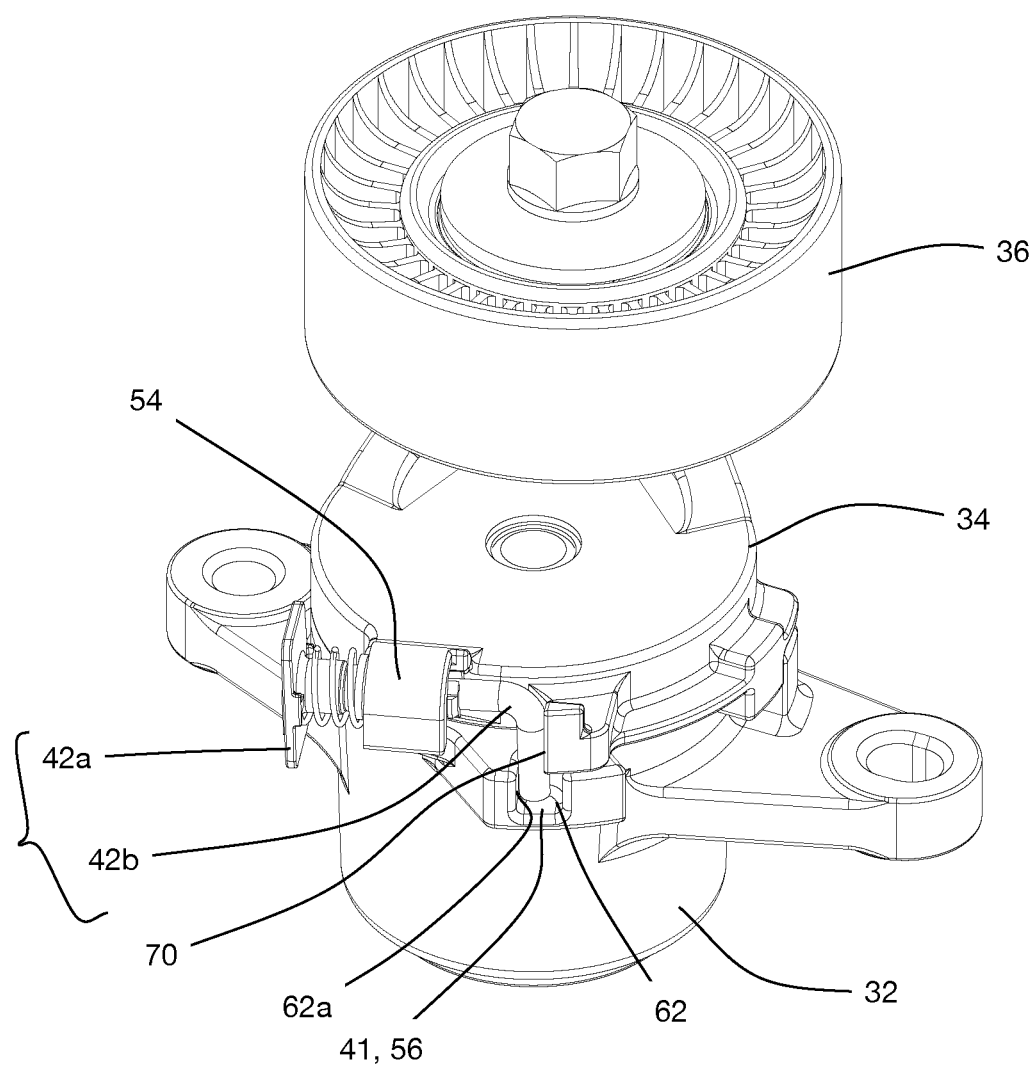
FIG. 11 is a perspective view of a tensioner in accordance with yet another embodiment of the present disclosure, with a projection in a locking position, wherein the projection is oriented tangentially.
Figure 12:
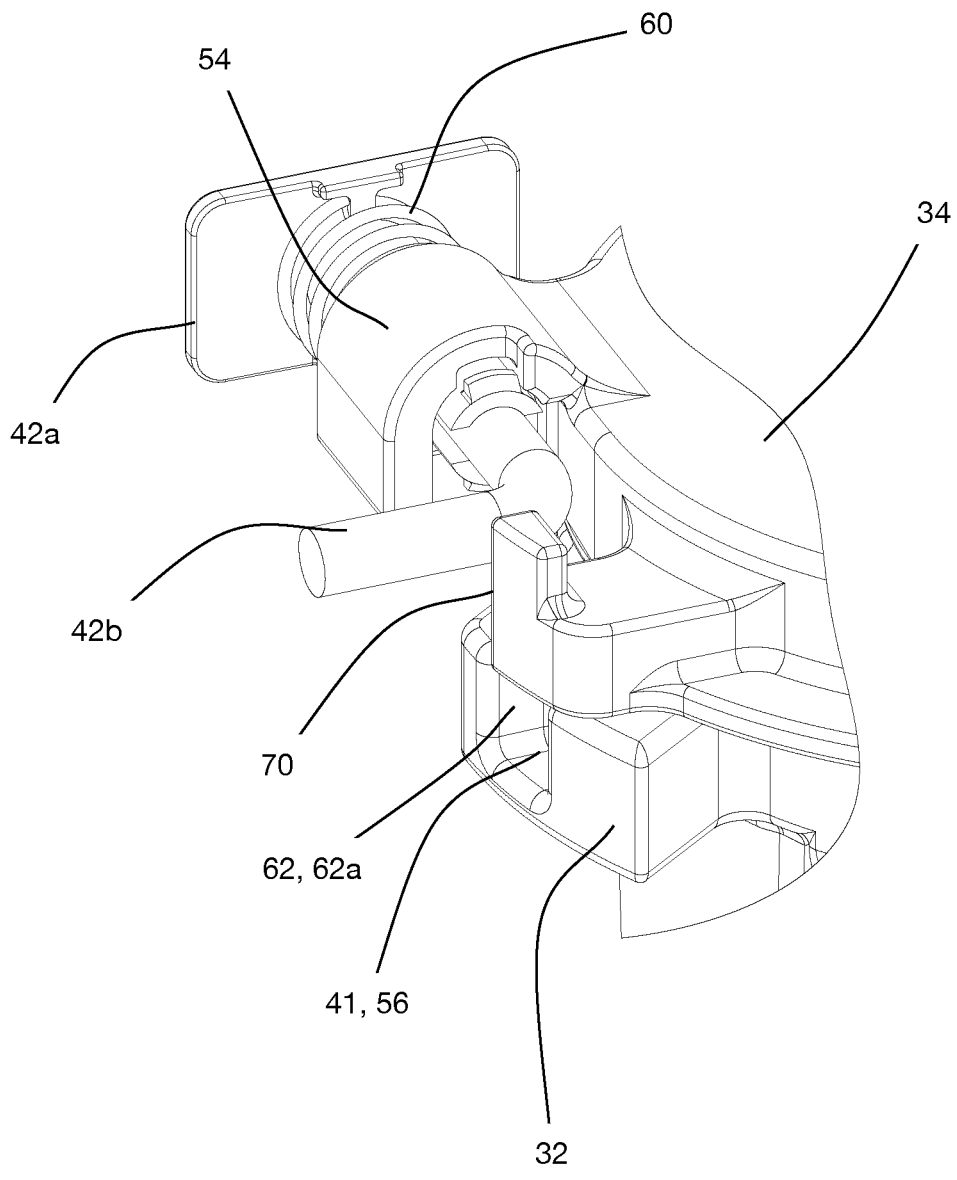
FIG. 12 is a perspective view of a portion of the tensioner shown in FIG. 11, with the projection in a release position.

In yet another embodiment, the tensioner 30 may be arranged such that the projection 42 is oriented tangentially instead of axially or radially, as shown in FIG. 11. FIG. 11 shows the projection 42 in the locking position, while FIG. 12 shows the projection 42 in the release position. The projection 42 in the embodiment in FIGS. 11 and 12 may be pivotable between the release position and the locking position.

The assembly of the projection 42 in the embodiment shown in FIGS. 11 and 12 is described below. The projection 42 is shown in a disassembled form in FIG. 13A. The second projection part 42b is shown oriented in an installation position. The first projection part 42a is inserted into the first pass-through aperture 54. One of the tabs 51a and 51b is constrained to pass through an orientation channel shown at 74 in the first pass-through aperture 54 which holds the first projection portion 42a in a specific orientation. Optionally, the first projection portion 42a is inserted into the first pass-through aperture 54 sufficiently that the aforementioned one of the tabs 51a and 51b clears the orientation channel 74, although it need not. The second projection-withdrawal limit surface 48 in this embodiment is not internal to the first pass-through aperture 54, but is instead on one end of the first pass-through aperture 54.

Figures 13A, 13B, 13C, 13D:
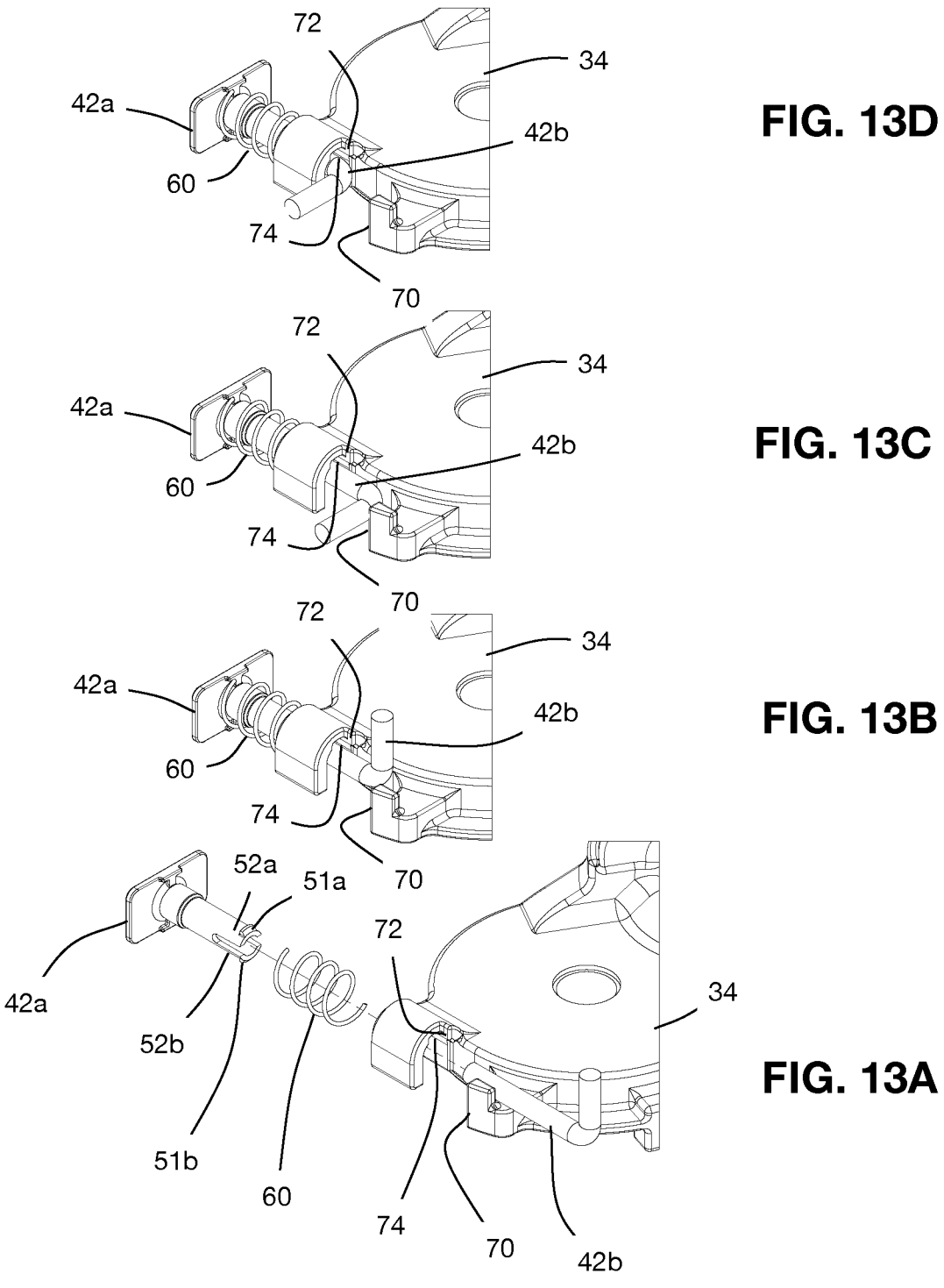
FIG. 13A is a perspective exploded view of a portion of the tensioner shown in FIG. 11, illustrating a step in the assembly of the projection.
FIG. 13B is a perspective exploded view of a portion of the tensioner shown in FIG. 11, illustrating another step in the assembly of the projection.
FIG. 13C is a perspective exploded view of a portion of the tensioner shown in FIG. 11, illustrating another step in the assembly of the projection.
FIG. 13D is a perspective exploded view of a portion of the tensioner shown in FIG. 11, illustrating another step in the assembly of the projection.
Figures 14A, 14B:
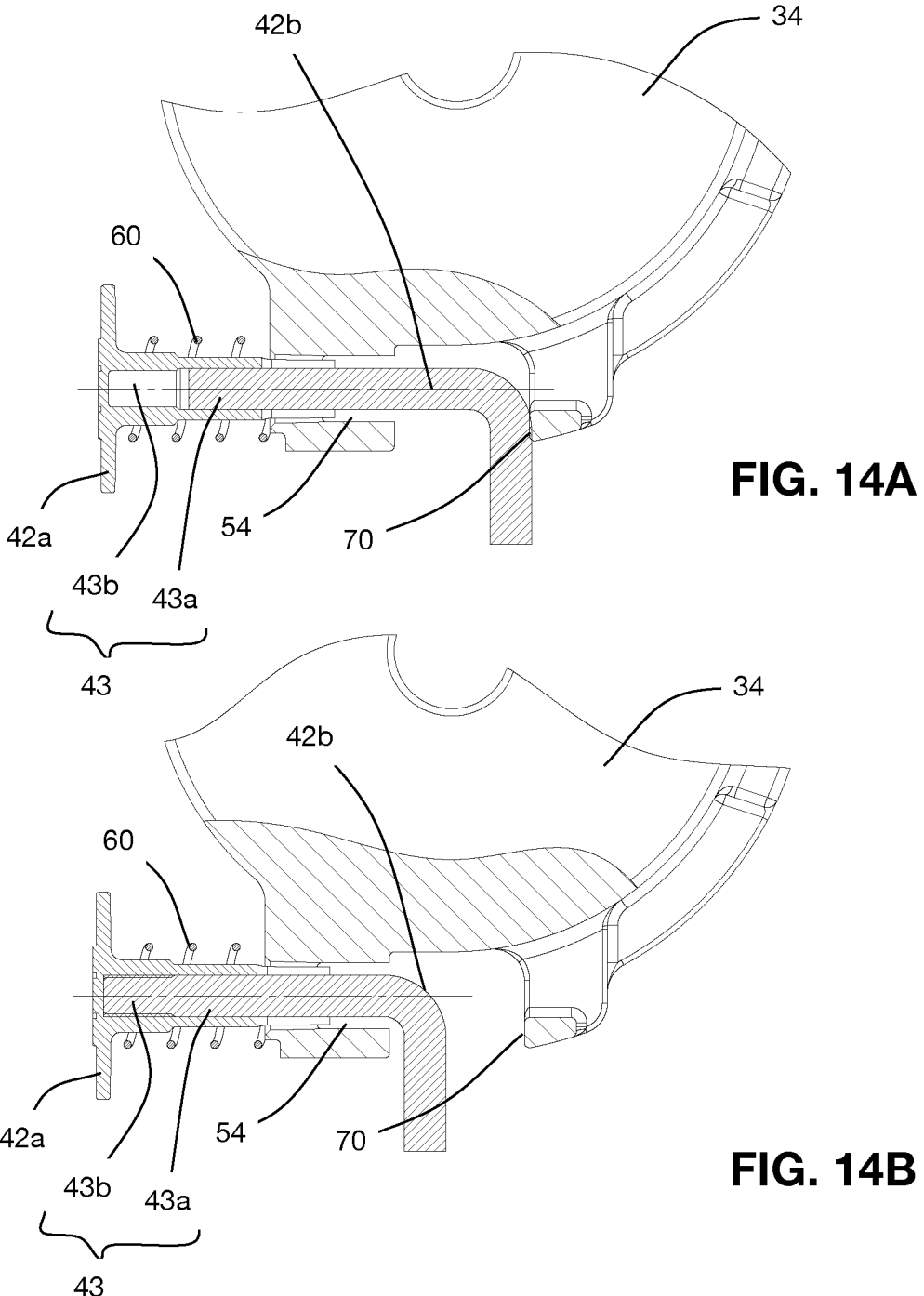
FIG. 14A is a sectional plan view of a portion of the tensioner shown in FIG. 11, illustrating the assembly step shown in FIG. 13C.
FIG. 14B is a sectional plan view of a portion of the tensioner shown in FIG. 11, illustrating the assembly step shown in FIG. 13D.

When the first projection portion 42*a* is at least partially inserted into the first pass-through aperture 54 (e.g. as shown in FIG. 13B), the second projection part 42*b* is inserted into a first portion 43*a* of the recess 43 of the first projection part 42*a*. The recess 43 includes a first portion 43*a* and a second portion 43*b*, and is shown in more detail in FIGS. 14A and 14B. The first portion 43*a* of the recess 43 is wider than the second portion 43*b* of the recess 43. Accordingly, the first portion 43*a* has a looser fit on the second projection part 42*b* than the second portion 43*b* has. When the second projection portion 42*b* is inserted into the first portion 43*a* of the recess 43 (FIG. FIG. 13B), the second projection portion 42*b* can still rotate. The second projection portion 42*b* is inserted sufficiently deeply into the first portion 43*a* of the recess to clear the second-part-withdrawal limit surface 70. The second projection portion 42*b* may then be rotated by some amount such that it is positioned to be limited by the second-part-withdrawal limit surface 70. This is the position shown in FIG. 13C and 14A. The first projection part 42*a* is oriented such that at least one of the tabs 51*a* and 51*b* is engaged with a rotation limit surface 72. The second projection part 42*b* may then be inserted further into the recess 43 so as to engage the second portion 43*b* which is a tighter fit on the second projection part 42*b* than is the first portion 43*a* of the recess 43, and which is a sufficiently tight fit that the second projection part 42*b* is not rotatable in the recess 43 at this point. This position is shown in FIGS. 13D and 14B.

If needed, the first projection part 42*a* is then inserted sufficiently until the aforementioned one of the tabs 51*a* and 51*b* clears the orientation channel 74. At this point, one of the tabs 51*a* and 51*b* is engaged with a rotation limit surface 76 on the tensioner arm 34 (FIG. 12). The projection 42 has at this point been assembled and is in the release position. The projection 42 may be rotated from this position to the locking position, shown in FIG. 11.

The projection biasing member 60 in this embodiment is a helical torsion spring instead of a compression spring, however, any suitable type of biasing member may be used.

In this embodiment, the projection 42 and the locking feature 41 are positioned such that, when the projection 42 is in the locking position, urging of the tensioner arm 34 in the free arm direction D1 by the tensioner arm biasing member 38 causes a locking force F1 to be applied by the locking feature 41 on the projection 42 to hold the projection 42 in the locking position, and such that, movement of the tensioner arm 34 opposite to the free arm direction D1 releases the locking force F1 so as to permit the projection biasing member 60 to drive the projection 42 to the release position, thereby freeing the tensioner arm 34 to move in the free arm direction D1. In this embodiment, the friction force that is the locking force F1 is applied between a wall portion 62*a* of the wall 62.

Figure 15:
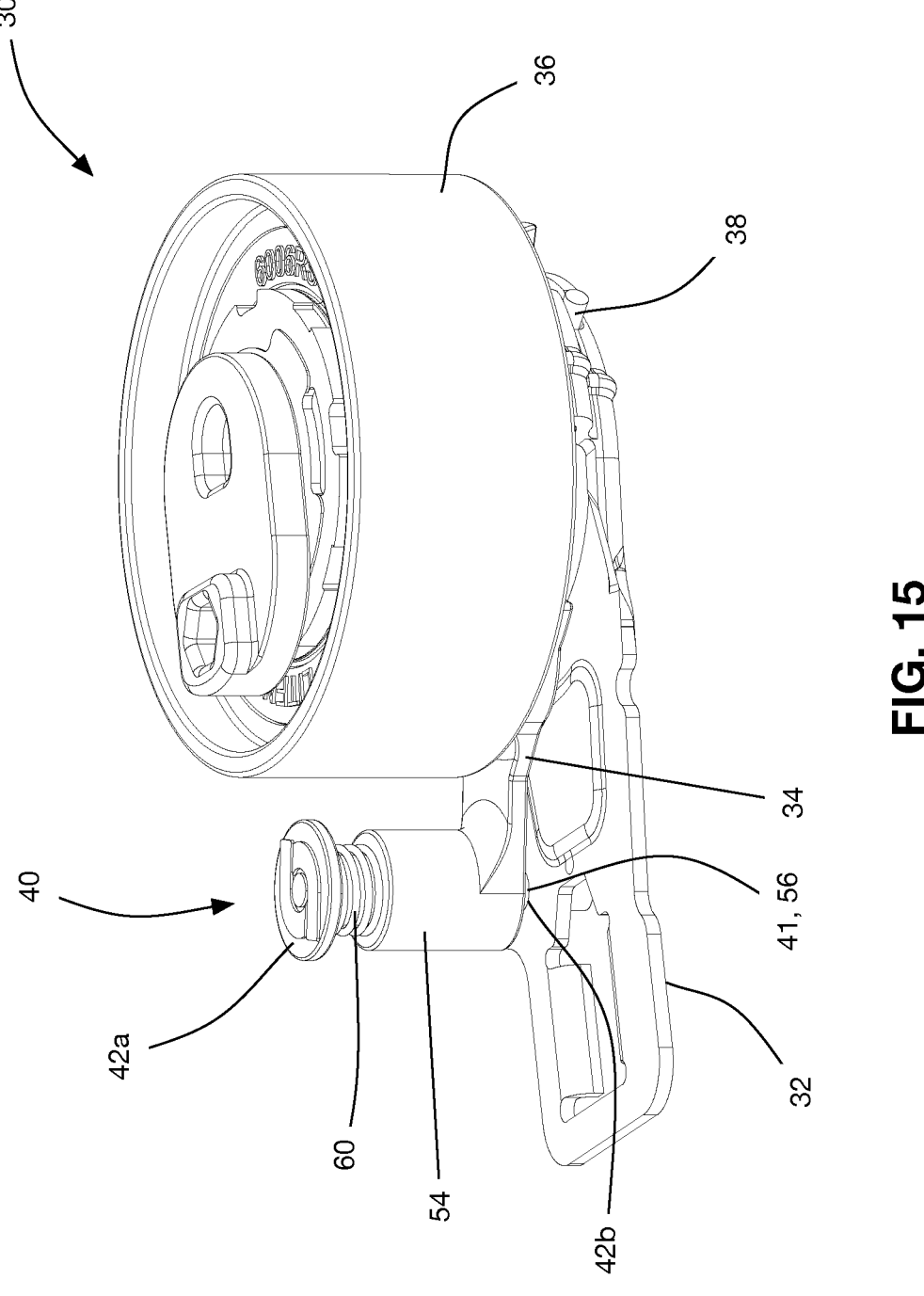
FIG. 15 is a perspective view of a tensioner in accordance with yet another embodiment of the present disclosure, wherein the tensioner is a timing belt tensioner.

The embodiments shown in FIGS. 1-14 are all tensioners for an accessory drive. It will be understood by one skilled in the art that the tensioner lock 40 may be provided on a timing belt tensioner, as shown in FIG. 15, which is used to tension a timing belt (not shown). In the embodiment shown in FIG. 15, the projection 42 is movable in an axial direction, however any other type of movement may be provided based on the needs (e.g. the available room) of the particular engine on which the tensioner 30 is being used.

Figure 16:
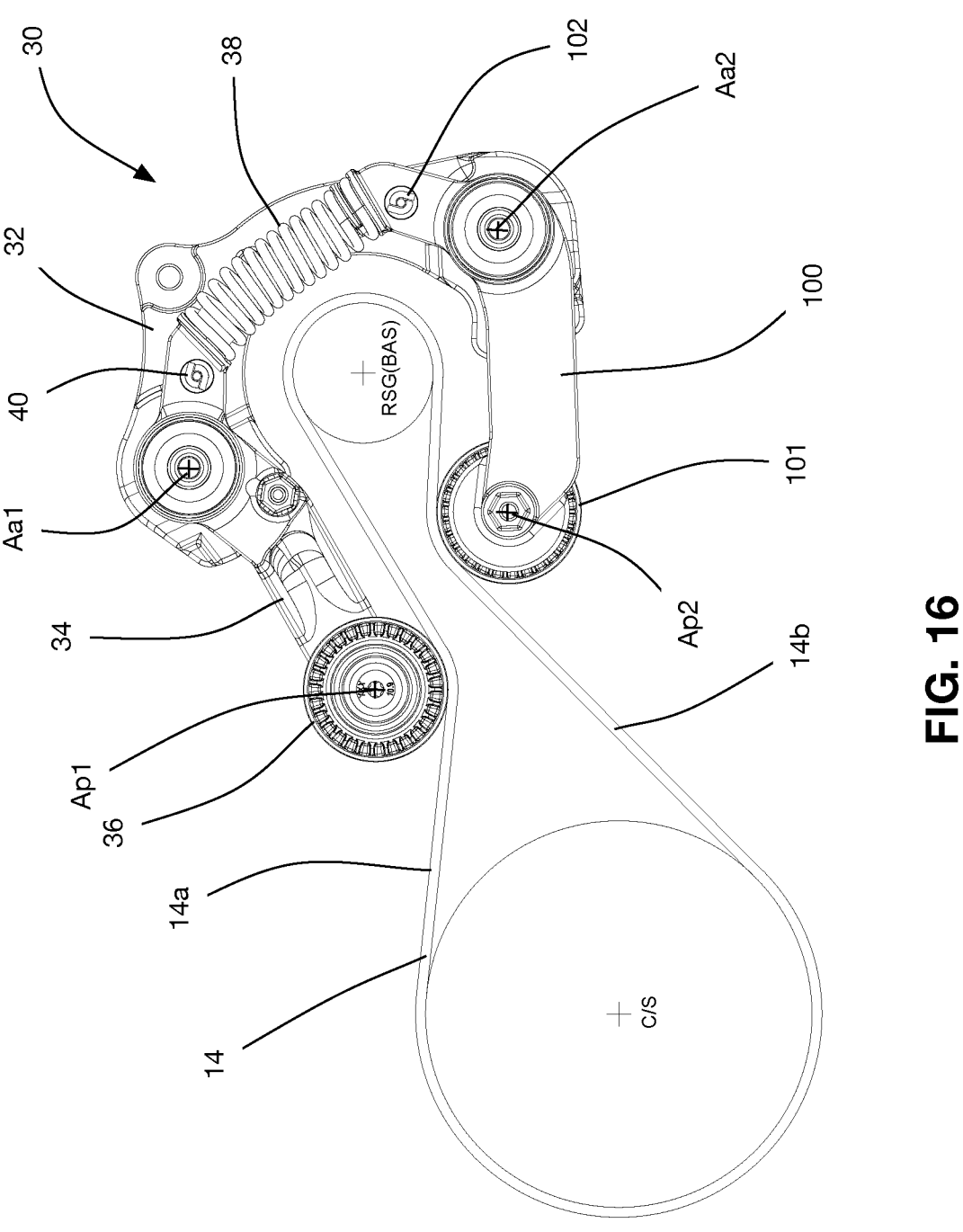
FIG. 16 is a plan view of a tensioner in accordance with yet another embodiment of the present disclosure, wherein the tensioner is a two-axis, pivoting, two-armed tensioner.

The embodiments shown in FIGS. 1-15 are all single-arm tensioners. However, it is alternatively possible for the tensioner 30 to be a two-arm tensioner. For example, in the embodiment shown in FIGS. 16, 17 and 18, the tensioner 30 is a two-axis, pivoting, two-armed tensioner that includes the tensioner arm 34, which is a first tensioner arm, and a second tensioner arm shown at 100. The first tensioner arm 34 is movable about a first tensioner arm axis Aa1 and the second tensioner arm 100 is movable about a second tensioner arm axis Aa2 that is different than the first tensioner arm axis Aa1. The first tensioner pulley 38 is rotatable about a first tensioner pulley axis Ap1 that is spaced from the first tensioner arm axis Aa1, while the second tensioner arm 100 has a second tensioner pulley 101 thereon that is rotatable about a second tensioner pulley axis Ap2. The tensioner 30 may be as described in any of the embodiments of U.S. Pat. No. 9,759,293, the contents of which are incorporated herein in their entirety. The tensioner 30 in this embodiments employs the first tensioner arm 34 to engage a first span 14*a* of the belt 14, and the second tensioner arm 100 to engage a second span 14*b* of the belt 14. Each of the first and second tensioner arms 34 and 100 may be biased or urged in a respective free-arm direction (which is counter clockwise for the first tensioner arm 34 and clockwise for the second tensioner arm 100) by a tensioner arm biasing member 38, that is, in the present embodiment, a helical compression spring, but which could be any other suitable type of biasing member, and which could be made up of two or more separate biasing members.

Figure 17:
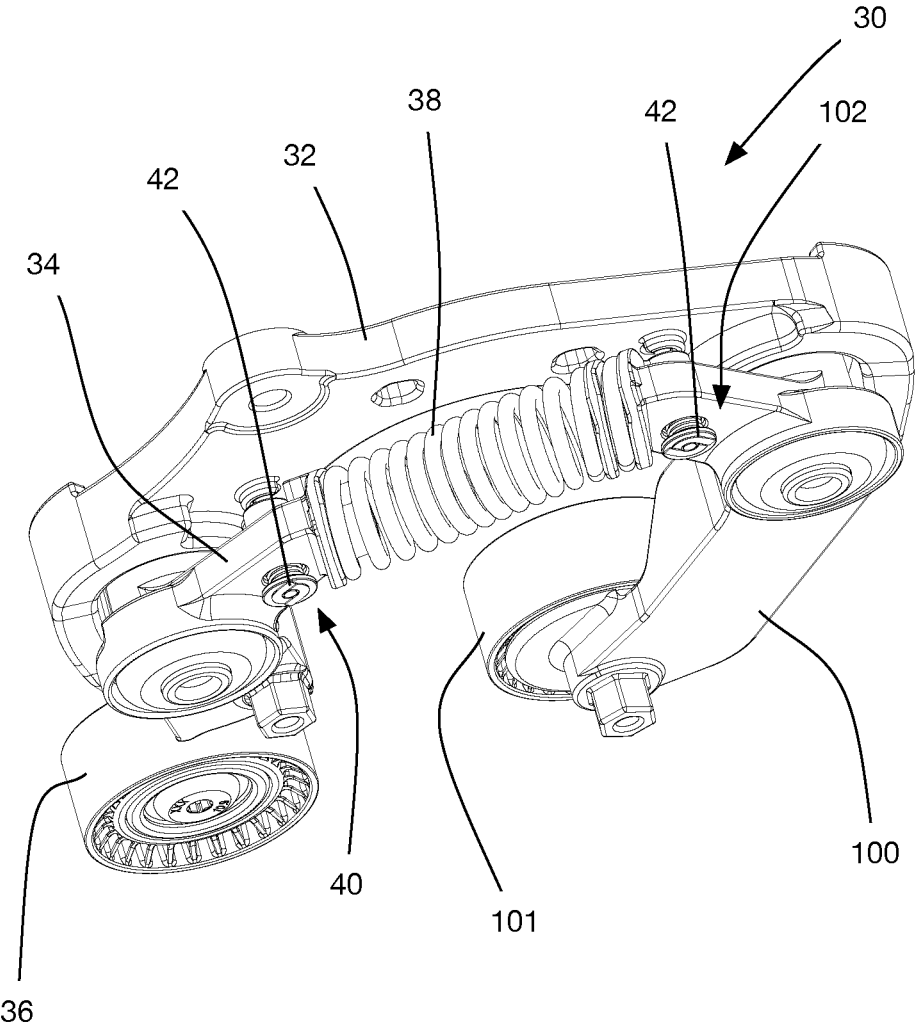
FIG. 17 is a perspective view of the tensioner shown in FIG. 16.
Figure 18:
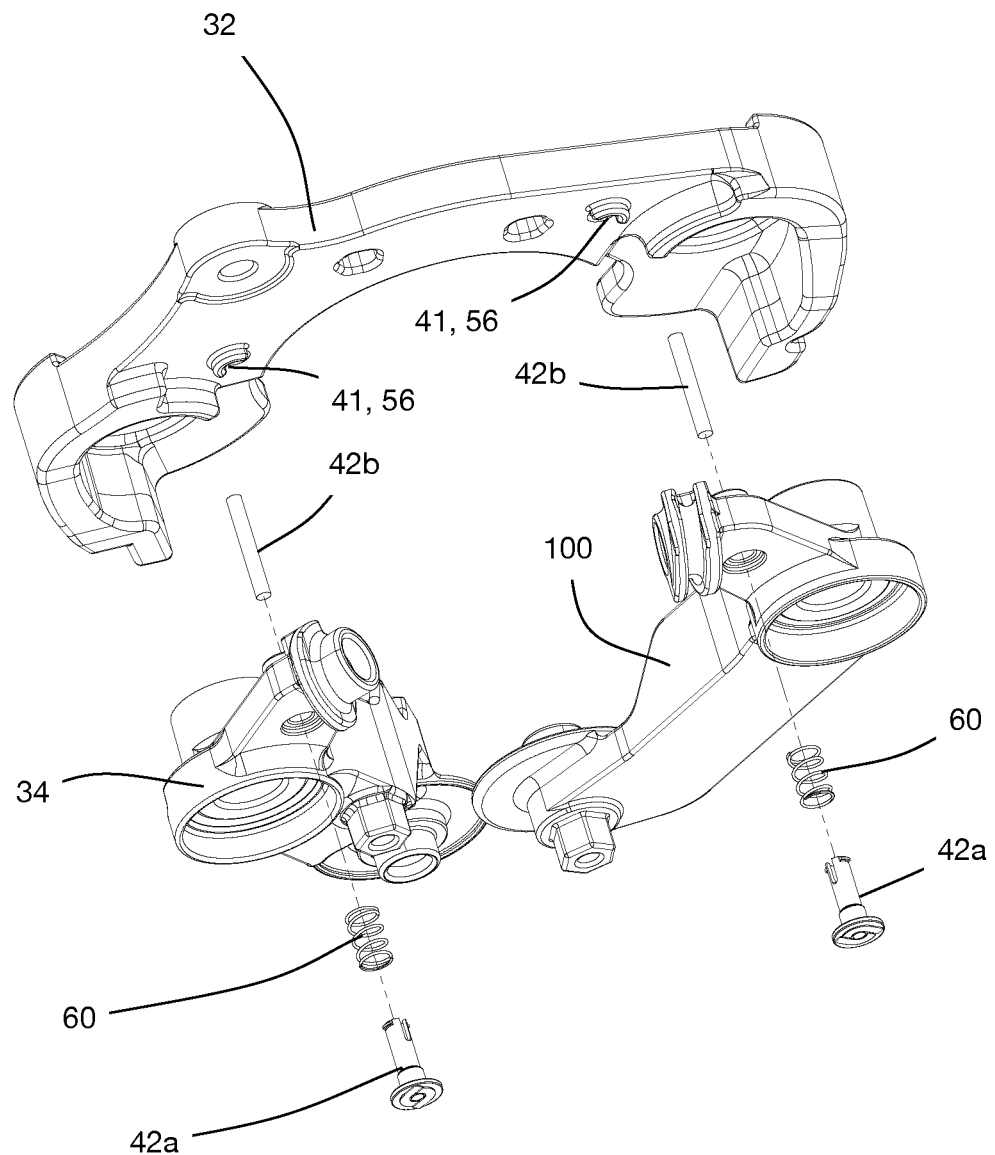
FIG. 18 is an exploded perspective view of the tensioner shown in FIG. 16.

FIG. 17 is a perspective view of the tensioner 30, and FIG. 18 is an exploded view of the tensioner 30. As can be seen, each of the first and second tensioner arms 34 and 100 includes a tensioner lock. The tensioner lock for the first tensioner arm 34 is shown at 40, and is similar to the tensioner lock 40 shown in FIG. 2. The tensioner lock for the second tensioner arm 100 is shown at 102, and may also be similar to the tensioner lock 40 shown in FIG. 2. For each of the tensioner locks 40 and 102, and is positioned to hold the respective first and second tensioner arms 34 and 100 in a locking position relative to the tensioner base 32. FIG. 18 shows the elements that make up the tensioner locks 40 and 102 in further detail.

Figure 19:
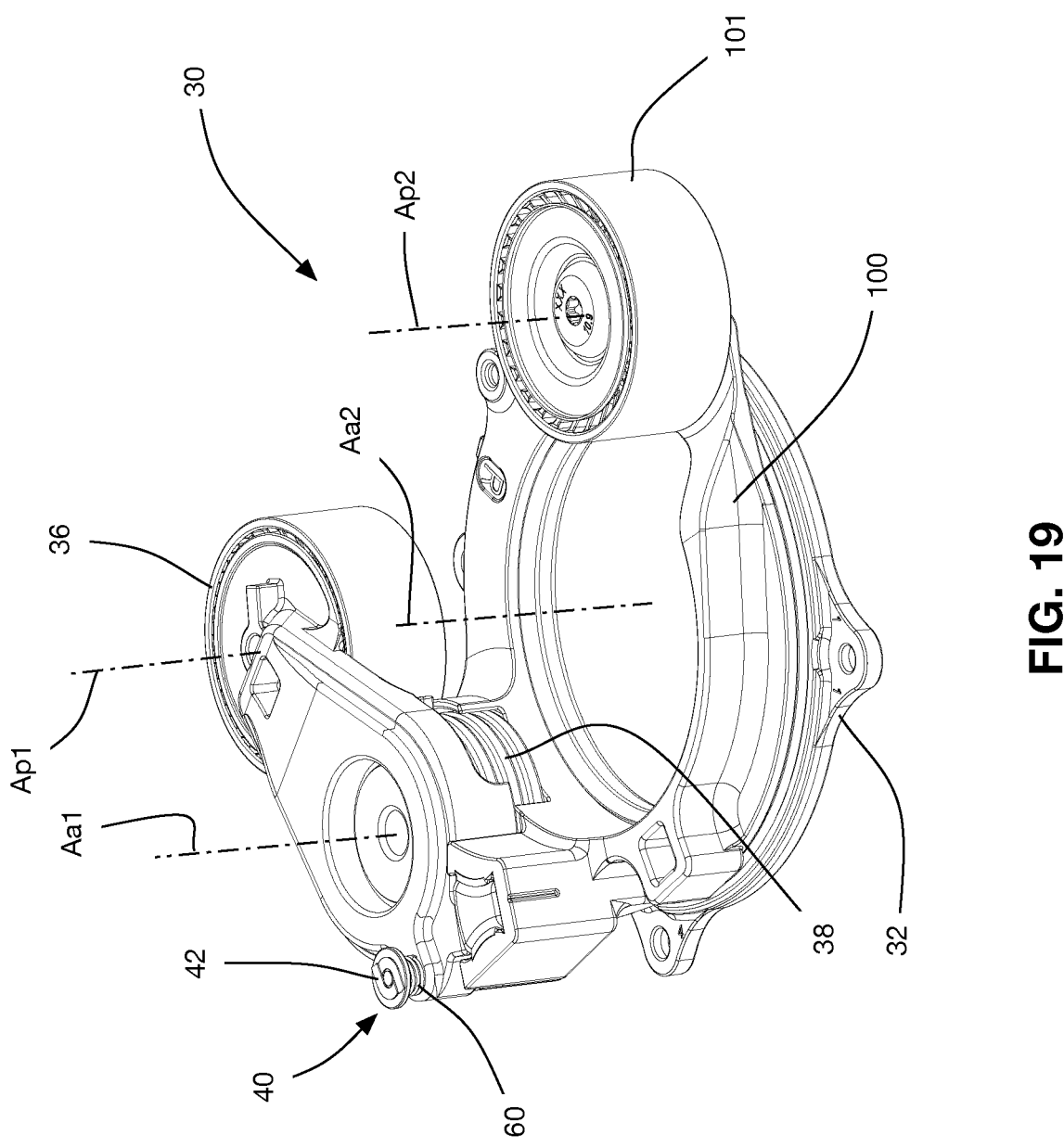
FIG. 19 is a perspective view of a tensioner in accordance with yet another embodiment of the present disclosure, wherein the tensioner is a type of orbital, two-armed tensioner.
Figure 20:
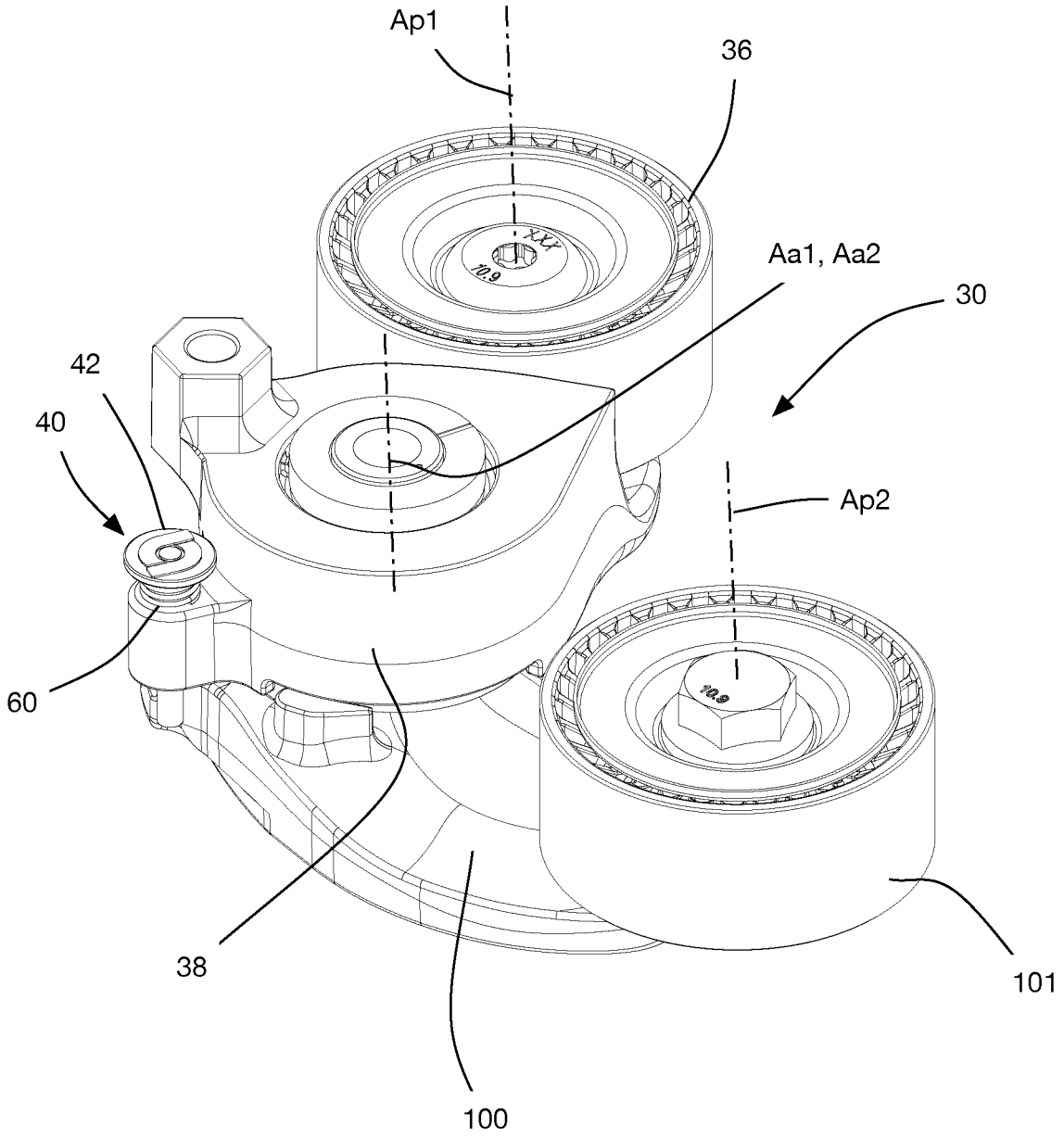
FIG. 20 is a perspective view of a tensioner in accordance with yet another embodiment of the present disclosure, wherein the tensioner is a single axis, pivoting, two-armed tensioner (also known as a V tensioner).

FIG. 19 and FIG. 20 show other types of two-armed tensioners 30. The tensioner 30 shown in FIG. 19 is a type of orbital, two-armed tensioner, while the tensioner 30 shown in FIG. 20 is a single-axis, pivoting, two-armed tensioner (also known as a V tensioner). These two tensioners 30 both differ in at least one respect from the two-armed tensioner 30 shown in FIGS. 16-18. For example, the tensioners 30 shown in FIGS. 19 and 20 both employ a single tensioner lock 40, which acts to lock the first tensioner arm 34 to limit movement thereof past a limit position, relative to the second tensioner arm 100, as opposed to locking the first tensioner arm 34 (and the second tensioner arm 100) relative to the tensioner base 32.

For the embodiments shown in FIGS. 19 and 20, the tensioner 30 may be said to include a tensioner base 32 that is mounted to be stationary relative to the engine. The tensioner 30 further includes a first tensioner arm 34 that is movably mounted to the tensioner base 32 for movement about a first tensioner arm axis Aa1 and which has a first tensioner pulley 36 rotatably mounted thereto for rotation about a first tensioner pulley axis Ap1 that is spaced from the first tensioner arm axis Aa1. The first tensioner pulley 36 is positioned for engagement with a first span 14*a* of an endless drive member 14 of the endless drive arrangement. The tensioner 30 further includes the second tensioner arm 100 that is movably mounted to the tensioner base 32 for movement about a second tensioner arm axis Aa2 and which has a second tensioner pulley 101 rotatably mounted thereto for rotation about a second tensioner pulley axis Ap2 that is spaced from the second tensioner arm axis Aa2. The second tensioner pulley Ap2 is positioned for engagement with a second span 14*b* of the endless drive member 14 of the endless drive arrangement. The tensioner 30 further includes a tensioner arm biasing member 38 that is positioned to bias the first and second tensioner arms 34 and 100 in a free arm direction relative to one another. The tensioner 30 further includes a tensioner lock 40, which includes a locking feature 41, a projection 42 and a projection biasing member 60. The locking feature 41 is on one of the first tensioner arm 34 and the second tensioner arm 100. The projection 42 is movably mounted to the other of the first tensioner arm 34 and the second tensioner arm 100, and is movable between a locking position and a release position. In the locking position (using the same motion as is shown in FIGS. 2-6), the projection 42 cooperates with the locking feature 41 to limit movement of the first and second tensioner arms 34 and 100 in the free arm direction past a limit position. In the release position, the projection permits movement of the first and second tensioner arms in the free arm direction (i.e. past the limit position). The projection biasing member 60 is positioned to urge the projection 42 towards the release position. The projection 42 and the locking feature 41 are positioned such that, when the projection 42 is in the locking position, urging of the first and second tensioner arms 34 and 100 in the free arm direction D1 by the tensioner arm biasing member 38 causes the locking force F1 to be applied by the locking feature on the projection 42 to hold the projection 42 in the locking position, and such that, movement of the first and second tensioner arms 34 and 100 opposite to the free arm direction D1 releases the locking force so as to permit the projection biasing member 60 to drive the projection 42 to the release position, thereby freeing the first and second tensioner arms 34 and 100 to move in the free arm direction D1. The projection 42 includes a first projection part 42*a* and a second projection part 42*b*. One of the first and second projection parts 42*a* and 42*b* includes a recess 43 into which the other of the first and second projection parts 42*a* and 42*b* extends to hold the first and second projection parts together. The second projection part 42*b* is engageable with the locking feature 41 to limit movement of the first and second tensioner arms 34 and 100 in the free arm direction D1 past the limit position. The limit position is shown in solid lines in FIGS. 19 and 20 for the respective tensioners 30 shown therein. The first projection part 42*a* has a first projection-withdrawal limit surface 46 thereon that is engageable with a second projection-withdrawal limit surface 70 on the other of the first and second tensioner arms 34 and 100 to prevent complete withdrawal of the projection 42 from said other of the first and second tensioner arms 34 and 100.

In the embodiment shown in FIG. 19, the first and second tensioner arm axes Aa1 and Aa2 are separate axes, whereas in FIG. 20, the first and second tensioner arm axes Aa1 and Aa2 are the same axis (i.e. are coextensive).

In the disclosure herein, the terms 'bias' and 'urge' and variants thereof may be used interchangeably and are intended to mean the same thing as one another.

While the description contained herein constitutes a plurality of embodiments of the present invention, it will be appreciated that the present invention is susceptible to further modification and change without departing from the fair meaning of the accompanying claims.

What is claimed is:

1. A tensioner for tensioning an endless drive arrangement on an engine, the tensioner comprising:

a tensioner base that is mounted to be stationary relative to the engine;

a tensioner arm that is movably mounted to the tensioner base for movement about a tensioner arm axis and which has a tensioner pulley rotatably mounted thereto for rotation about a tensioner pulley axis that is spaced from the tensioner arm axis, wherein the tensioner pulley is positioned for engagement with an endless drive member of the endless drive arrangement;

a tensioner arm biasing member that is positioned to bias the tensioner arm in a free arm direction; and a tensioner lock, including:

a locking feature on one of the tensioner arm and the tensioner base, a projection that is movably mounted to the other of the tensioner arm and the tensioner base, and is movable between a locking position and a release position, wherein, in the locking position, the projection cooperates with the locking feature to limit movement of the tensioner arm in the free arm direction past a limit position, and wherein, in the release position, the projection permits movement of the tensioner arm in the free arm direction; and a projection biasing member that is positioned to urge the projection towards the release position, wherein, the projection and the locking feature are positioned such that, when the projection is in the locking position, urging of the tensioner arm in the free arm direction by the tensioner arm biasing member causes a locking force to be applied by the locking feature on the projection to hold the projection in the locking position, and such that, movement of the tensioner arm opposite to the free arm direction releases the locking force so as to permit the projection biasing member to drive the projection to the release position, thereby freeing the tensioner arm to move in the free arm direction, wherein the projection includes a first projection part and a second projection part, wherein one of the first and second projection parts includes a recess into which the other of the first and second projection parts extends to hold the first and second projection parts together, wherein the second projection part is engageable with the locking feature to limit movement of the tensioner arm in the free arm direction past the limit position, and wherein the first projection part has a first projection-withdrawal limit surface thereon that is engageable with a second projection-withdrawal limit surface on said other of the tensioner arm and the tensioner base to prevent complete withdrawal of the projection from said other of the tensioner arm and the tensioner base, wherein the first projection part includes a first flex arm and a second flex arm, wherein the first flex arm includes a first tab with a first lip surface and the second flex arm includes a second tab with a second lip surface, wherein the first projection-withdrawal limit surface includes the first and second lip surfaces, wherein said other of the tensioner arm and the tensioner base has a first pass-through aperture having a first portion, wherein the first and second flex arms are compressible to permit the first projection part to pass through the first portion of the first pass-through aperture, wherein the second projection-withdrawal limit surface is positioned at the end of the first portion of the first pass-through aperture, such that, once the first and second tabs have cleared the first portion of the first pass-through aperture, the flex arms expand outwards such that the first projection-withdrawal limit surface is positioned to interact with the second projection-withdrawal limit surface to prevent complete withdrawal of the projection from said other of the tensioner arm and the tensioner base, wherein the second projection part is insertable into the first pass-through aperture to connect to the first projection portion.

2. The tensioner as claimed in claim 1, wherein the projection is movable in an axial direction between the release position and the locking position.

3. The tensioner as claimed in claim 1, wherein the projection is movable in a radial direction between the release position and the locking position.

4. The tensioner as claimed in claim 1, wherein the projection is oriented tangentially and is pivotable between the release position and the locking position.

5. The tensioner as claimed in claim 1, wherein the first projection part is plastic and the second projection part is metallic.

6. The tensioner as claimed in claim 1, wherein said other of the tensioner arm and the tensioner base has a first pass-through aperture, wherein the first projection part is captured in the first pass-through aperture by at least the first and second projection-withdrawal limit surfaces, and wherein said one of the tensioner arm and the tensioner base includes a second-part-withdrawal limit surface that is positioned to prevent complete withdrawal of the second projection part from the first projection part.

7. The tensioner as claimed in claim 1, wherein the locking feature is a locking aperture and the locking force is a friction force between a wall of the locking aperture and the second projection part.

8. The tensioner as claimed in claim 1, wherein the tensioner arm is a first tensioner arm that is movable in a first free arm direction, the tensioner pulley is a first tensioner pulley and is positioned for engagement with a first span of the endless drive member, and the tensioner lock is a first tensioner lock, and wherein the tensioner further includes a second tensioner arm that is movably mounted to the tensioner base for movement about a second tensioner arm axis in a second free-arm direction, and which has a second tensioner pulley rotatably mounted thereto for rotation about a second tensioner pulley axis that is spaced from the second tensioner arm axis, wherein the second tensioner pulley is positioned for engagement with a second span of the endless drive member of the endless drive arrangement.

* * * * *